(12) United States Patent
Cho et al.

(10) Patent No.: US 10,354,576 B2
(45) Date of Patent: Jul. 16, 2019

(54) OPTICAL DEVICE INCLUDING OPTICAL MODULATION DEVICE, AND DRIVING METHOD THEREOF

(71) Applicant: SAMSUNG DISPLAY CO., LTD., Yongin-si, Gyeonggi-do (KR)

(72) Inventors: Jung-Hyun Cho, Seoul (KR); Junghwan Yi, Yongin-si (KR); Chunki Choi, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 57 days.

(21) Appl. No.: 15/057,876

(22) Filed: Mar. 1, 2016

(65) Prior Publication Data
US 2016/0275884 A1    Sep. 22, 2016

(30) Foreign Application Priority Data
Mar. 17, 2015 (KR) .................. 10-2015-0036789

(51) Int. Cl.
*G09G 3/20* (2006.01)
*G09G 3/36* (2006.01)
(Continued)

(52) U.S. Cl.
CPC ......... *G09G 3/2022* (2013.01); *G09G 3/3611* (2013.01); *H04N 13/315* (2018.05);
(Continued)

(58) Field of Classification Search
CPC .................. G09G 3/2022; H04N 13/0452
See application file for complete search history.

(56) References Cited

U.S. PATENT DOCUMENTS 6,133,980 A * 10/2000 Faris ............... B82Y 15/00
  349/175
6,661,483 B1 * 12/2003 Moriwaki ........ G02F 1/13363
  349/102
(Continued)

FOREIGN PATENT DOCUMENTS

KR    1020100009739    1/2010
KR    1020140078267    6/2014

OTHER PUBLICATIONS

Sung-Min Jung, et al., "25.4L: Late-News Papers: A Novel Polarizer Glasses-Type 3D Displays With an Active Retarder", SID 09 Digest, 2009, pp. 348-351.

*Primary Examiner* — Nitin Patel
*Assistant Examiner* — Robert M Stone
(74) *Attorney, Agent, or Firm* — F. Chau & Associates, LLC

(57) ABSTRACT

An optical device includes a display panel displaying an image and an optical modulation device that includes a first plate and second plate disposed to face each other and a liquid crystal layer disposed between the first plate and the second plate and including a plurality of liquid crystal molecules, wherein the first plate includes a plurality of lower electrodes extending in a first direction and arranged in a second direction crossing the first direction and the second plate include and an upper electrode. When the display panel displays a first image during a first subframe, the optical modulation device applies a first driving signal to the plurality of lower electrodes, and when the display panel displays a second image during a second subframe following the first subframe, the optical modulation device applies a second driving signal different from the first driving signal to the plurality of lower electrodes.

18 Claims, 25 Drawing Sheets

(51) Int. Cl.
*H04N 13/337* (2018.01)
*H04N 13/315* (2018.01)
(52) U.S. Cl.
CPC ..... *H04N 13/337* (2018.05); *G09G 2300/023* (2013.01); *G09G 2300/0447* (2013.01)

(56) References Cited

U.S. PATENT DOCUMENTS

| | | | |
|---|---|---|---|
| 6,975,345 B1 | 12/2005 | Lipton et al. | |
| 9,316,877 B2* | 4/2016 | Lee | G02F 1/1347 |
| 2003/0147029 A1* | 8/2003 | Liu | G02F 1/13363 |
| | | | 349/113 |
| 2003/0210369 A1* | 11/2003 | Wu | G02F 1/133555 |
| | | | 349/114 |
| 2005/0007331 A1* | 1/2005 | Yamazaki | G09G 3/2011 |
| | | | 345/92 |
| 2005/0213003 A1* | 9/2005 | Kaneko | G02F 1/133555 |
| | | | 349/114 |
| 2007/0008406 A1* | 1/2007 | Shestak | G02B 27/2214 |
| | | | 348/58 |
| 2009/0161044 A1* | 6/2009 | Ge | G02F 1/133555 |
| | | | 349/98 |
| 2011/0181795 A1* | 7/2011 | Hosaka | G09G 3/3611 |
| | | | 348/790 |
| 2013/0063685 A1* | 3/2013 | Hsiao | C08J 7/04 |
| | | | 349/96 |
| 2013/0088669 A1* | 4/2013 | Lee | G02F 1/1347 |
| | | | 349/96 |
| 2013/0222711 A1* | 8/2013 | Fang | G02B 27/2214 |
| | | | 349/15 |
| 2014/0009702 A1* | 1/2014 | Kim | G02F 1/133514 |
| | | | 349/15 |
| 2014/0253490 A1* | 9/2014 | Sumi | G09G 3/003 |
| | | | 345/174 |
| 2014/0307187 A1* | 10/2014 | Hsiao | G09G 3/003 |
| | | | 349/15 |
| 2015/0146118 A1* | 5/2015 | Seo | G02B 27/2214 |
| | | | 349/15 |
| 2015/0219911 A1* | 8/2015 | Cho | G02F 1/1393 |
| | | | 349/15 |

* cited by examiner

OPTICAL DEVICE INCLUDING OPTICAL MODULATION DEVICE, AND DRIVING METHOD THEREOF

CROSS-REFERENCE TO RELATED APPLICATION

This application claims priority under 35 U.S.C. § 119 from, and the benefit of, Korean Patent Application No. 10-2015-0036789 filed in the Korean Intellectual Property Office on Mar. 17, 2015, the contents of which are herein incorporated by reference in their entirety.

BACKGROUND

(a) Technical Field

Embodiments of the present disclosure are directed to an optical device that includes an optical modulation device, and a driving method thereof, and more particularly, embodiments of the present disclosure are directed to an optical device that includes an optical modulation device containing liquid crystals, and a driving method thereof.

(b) Discussion of Related Art

Recently, optical display devices that use an optical modulation device that modulates characteristics of light have been developed. For example, optical display devices that can display a 3D image divide an image with different viewpoints to be transmitted so that a viewer can perceive the image as a stereoscopic image. Optical modulation devices that can be used in an autostereoscopic 3D image display device include a lens, a prism, etc., for altering a path of light to transmit the image of the display device to a desired viewpoint.

As such, a direction of incident light can be altered by light diffraction through phase modulation thereof.

When polarized light passes through an optical modulation device such as a phase retarder, its polarization state is changed. For example, when circularly polarized light is incident on a half-wave plate, the circularly polarized light is emitted with its rotation direction reversed. For example, when left circularly polarized light passes through the half-wave plate, right circularly polarized light is emitted. In this case, a phase of the circularly polarized light shifts according to an optical axis of the half-wave plate, that is, a slow axis.

Specifically, when the optical axis of a half-wave plate rotates in-plane by $\varphi$, a phase of the outputted light shifts by $2\varphi$. Thus, when the optical axis of a half-wave plate is spatially rotated in a x-axis direction by 180° ($\pi$ radians), the emitted light may have a phase modulation or shift of 360° ($2\pi$ radians) in the x-axis direction. As such, when an optical modulation device induces a phase shift from 0 to $2\pi$, depending on position, a diffraction grating or prism that can alter or diffract the transmitted light can be implemented.

Liquid crystals may be used to easily adjust the optical axis of an optical modulation device, such as the half-wave plate, according to a position thereof. In an optical modulation device implemented as a phase retarder using liquid crystals, the long axes of the liquid crystal molecules, which are arranged by applying an electric field to a liquid crystal layer, may rotate to change the phase modulation as a function of position. The phase of the light emitted after passing through an optical modulation device may be determined by the directions of the long axes of the aligned liquid crystal molecules, that is, the azimuthal angle.

To implement a prism, diffraction grating, lens, etc., using an optical modulation device by using liquid crystals to continuously modulate phase, the liquid crystal molecules should be aligned so that directions of the long axes can continuously changed according to position. For the emitted light to have a phase profile that changes from 0 to $2\pi$ according to position, a half-wave plate should have an optical axis that changes from 0 to $\pi$. For this purpose, liquid crystals need to be aligned in different directions according to a position with respect to a substrate adjacent to the liquid crystal layer.

SUMMARY

Embodiments of the present disclosure can provide an optical device that includes an optical modulation device containing liquid crystals that can modulate an optical phase by controlling an in-plane rotation angle of the liquid crystal molecules.

In addition, embodiments of the present disclosure can provide an optical device and a driving method thereof that can use an optical modulation device as a lens in an optical device such as an autostereoscopic 3D image display device.

Further, embodiments of the present disclosure can provide an optical device and a driving method thereof that may variously control rotation directions of the liquid crystal molecules so that an optical modulation device can be used in an optical device such as a stereoscopic 3D image display device.

An exemplary embodiment of the present disclosure provides an optical device, including: a display panel for displaying an image; and an optical modulation device that includes a first plate and second plate disposed to face each other, a liquid crystal layer disposed between the first plate and the second plate and that includes a plurality of liquid crystal molecules, and a plurality of unit areas, wherein the first plate includes a plurality of lower electrodes that extend in a first direction and are arranged in a second direction crossing the first direction, the second plate includes an upper electrode, and when the display panel displays a first image during a first subframe, the optical modulation device applies a first driving signal to the plurality of lower electrodes, and when the display panel displays a second image during a second subframe following the first subframe, the optical modulation device applies a second driving signal different from the first driving signal to the plurality of lower electrodes.

The optical device may include a phase retardation plate on the display panel that may include a quarter-wave plate, the optical modulation device may change a circular polarization direction of light received from the phase retardation plate during the first subframe, and the optical modulation device may maintain the circular polarization direction of light received from the phase retardation plate during the second subframe.

The display panel may include a polarizer that linearly polarizes light of an image.

The first plate may include a first aligner, the second plate may include a second aligner, and an alignment direction of the first aligner and an alignment direction of the second aligner may be substantially parallel to each other.

The plurality of liquid crystal molecules may tilt parallel to surfaces of the first plate and the second plate during the first subframe.

Long axes of the plurality of liquid crystal molecules may be arranged in a direction parallel to the second direction.

The plurality of liquid crystal molecules may tilt perpendicular to the surfaces of the first plate and the second plate during the second subframe.

The optical modulation device may sequentially apply a first voltage to the lower electrodes included in the unit area along the second direction during the first subframe.

Time intervals of the first voltage respectively applied to the lower electrodes along the second direction during the first subframe may be constant.

The optical modulation device may sequentially apply the first voltage to each of a plurality of groups of adjacent lower electrodes included in the unit area along the second direction.

Time intervals of the first voltage respectively applied to the groups along the second direction during the first subframe may be constant.

The optical modulation device may simultaneously apply the first voltage to the plurality of lower electrodes during a first time interval of the first subframe, and the optical modulation device may simultaneously apply a second voltage greater than the first voltage to the plurality of lower electrodes during a second time interval of the first subframe that follows the first time interval.

Another embodiment of the present disclosure provides a method of driving an optical device which includes a display panel for displaying an image, and an optical modulation device that includes a first plate and a second plate disposed to face each other, and a liquid crystal layer disposed between the first plate and the second plate and that includes a plurality of liquid crystal molecules, the method including: displaying, by the display panel, a first image during a first subframe; applying, by the optical modulation device, a first driving signal to a plurality of lower electrodes included in the first plate, during the first subframe so that the plurality of liquid crystal molecules tilt parallel to surfaces of the first and second plates and long axes of the plurality of liquid crystal molecules arrange in a direction parallel to the second direction, wherein the lower electrodes extend in a first direction and are arranged in a second direction crossing the first direction; displaying, by the display panel, a second image during a second subframe that follows the first subframe; and applying, by the optical modulation device, a second driving signal different from the first driving signal to the plurality of lower electrodes during the second subframe so that the plurality of liquid crystal molecules tilt perpendicular to the surfaces of the first and second plates.

The first driving signal may sequentially apply a first voltage to the lower electrodes included in a unit area of the optical modulation device along the second direction.

Time intervals of the first voltage sequentially applied to the lower electrodes along the second direction may be constant.

The first driving signal may sequentially apply a first voltage to each of a plurality of groups of adjacent lower electrodes included in a unit area of the optical modulation device along the second direction.

Time intervals of the first voltage sequentially applied to the groups along the second direction during the first subframe may be constant.

The first driving signal may simultaneously apply a first voltage to the plurality of lower electrodes during a first time interval of the first subframe, and the optical modulation device may simultaneously apply a second voltage greater than the first voltage to the plurality of lower electrodes during a second time interval of the first subframe that follows the first time interval.

The optical modulation device may change a circular polarization direction of light received from a phase retardation plate disposed on the display panel during the first subframe, and the optical modulation device may maintain the circular polarization direction of light received from the phase retardation plate during the second subframe.

Another embodiment of the present disclosure provides a method of driving an optical device that includes a display panel that displays an image, and an optical modulation device that includes a plurality of first electrodes, a second electrode, and a liquid crystal layer disposed between the plurality of first electrodes and the second electrode and that includes a plurality of liquid crystal molecules, the method comprising: displaying, by the display panel, a first image during a first subframe; applying, by the optical modulation device, a first driving signal to the plurality of first electrodes during the first subframe wherein the plurality of liquid crystal molecules tilt parallel to surfaces of the first and second plates and long axes of the plurality of liquid crystal molecules arrange in a direction parallel to the second direction; displaying, by the display panel, a second image during a second subframe that follows the first subframe; and applying, by the optical modulation device, a second driving signal different from the first driving signal to the plurality of first electrodes during the second subframe wherein the plurality of liquid crystal molecules tilt perpendicular to the surfaces of the first and second plates, wherein a circular polarization direction of light received from the display panel is changed during the first subframe, and the circular polarization direction of light received from the display panel is maintained during the second subframe.

According to an embodiment of the present disclosure, an optical phase can be modulated by controlling an in-plane rotation angle of the liquid crystal molecules in an optical modulation device containing liquid crystals.

In addition, according to an embodiment of the present disclosure, rotation directions of liquid crystal molecules can be variously controlled so that an optical modulation device can be used in an optical device such as a stereoscopic 3D image display device, etc.

Further, according to an embodiment of the present disclosure, an optical modulation device can be used as a lens in an optical device such as an autostereoscopic 3D image display device, etc.

DETAILED DESCRIPTION OF EXEMPLARY EMBODIMENTS

Figure 1:
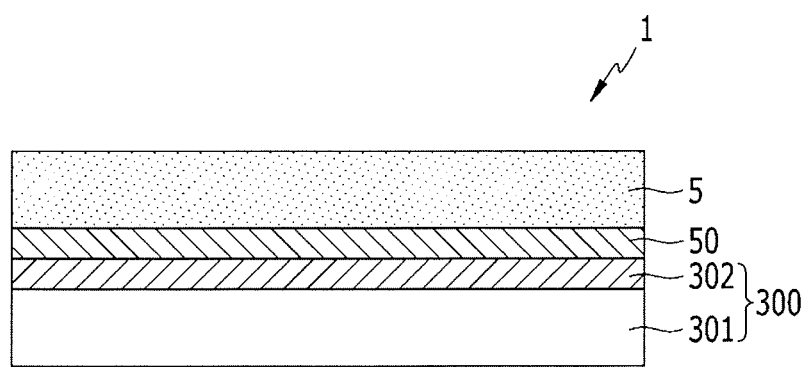
FIG. 1 is a schematic cross-sectional view of an optical device according to an exemplary embodiment of the present disclosure.

Embodiments of the present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

In exemplary embodiments that will be described with reference to drawings, an optical device may operate as an autostereoscopic 3D image display device or as a stereoscopic 3D image display device. That is, the optical device operates as the autostereoscopic 3D image display device in some exemplary embodiments of the present disclosure, and operates as the stereoscopic 3D image display device in other exemplary embodiments of the present disclosure.

First, an optical device including an optical modulation device according to an exemplary embodiment of the present disclosure will be described with reference to FIG. 1.

FIG. 1 is a schematic cross-sectional view of an optical device 1 according to an exemplary embodiment of the present disclosure. As shown in FIG. 1, as a 3D image display device, the optical device 1 may include a display panel 300, a phase retardation plate 50, and an optical modulation device 5.

The display panel 300 may display one 2-dimensional (2D) image in 2D mode. In addition, the display panel 300 may divide images that correspond to different viewpoints in 3D mode by a spatial division method or a temporal division method, and then may alternately display them based on position or time.

According to an example of a spatial division method, a first set of a plurality of pixels of the display panel 300 may emit light corresponding to one viewpoint image for one frame period, and remaining pixels except for the first set of pixels may emit light corresponding to the other viewpoint image. The number of viewpoints may be two or more.

According to an example of a temporal division method, the display panel 300 may display a first image during a first subframe period, and may display a second image during a second subframe period. The first subframe and the second subframe are alternately displayed for each of a plurality of consecutive frames.

The display panel 300 may include a plurality of electrical elements for displaying images, for example, an active substrate 301 that includes a plurality of signal lines and a plurality of pixels connected thereto, and a polarizer 302 attached to the active substrate. The polarizer 302 linearly polarizes incident light in a direction parallel to a transmissive axis. The linear polarization direction of the polarizer 302 may be an x-axis direction or a y-axis direction, but embodiments are not restricted thereto. The polarizer 302 may be provided between the active substrate 301 and a phase retardation plate 50, but embodiments are not restricted thereto.

The display panel 300 may be one of various display panels, such as an organic light emitting panel that includes an organic light emitting element, a liquid crystal panel that includes a liquid crystal layer, etc. When the display panel 300 according to an exemplary embodiment of the present disclosure is a liquid crystal panel, the display panel 300 may include a pair of polarizers that are respectively disposed at opposite surfaces of the active substrate 301. In this case, the transmissive axes of the two polarizers may cross.

The phase retardation plate 50 may be disposed in front of a surface on which the image of the display panel 300 is displayed, and it may be a film. The phase retardation plate 50 may be a quarter-wave plate that applies a ¼ wavelength phase retardation to the transmitted light. The image light emitted from the display panel 300 is linearly polarized so that it becomes circularly polarized through the phase retardation plate 50.

For example, an optical axis or a slow axis of the phase retardation plate 50 may be inclined at about 45 degrees with respect to the x-axis, or vice versa. In a present exemplary embodiment, it may be assumed that the slow axis of the phase retardation plate 50 is inclined at about 45 degrees with respect to the y-axis.

In this case, if light passing through the polarizer 302 is linearly polarized in the y-axis direction and then passes through the phase retardation plate 50, left circularly polarized light may be emitted. Alternatively, if the light passing through the polarizer 302 is linearly polarized in the x-axis direction and then passes through the phase retardation plate 50, right circularly polarized light may be emitted.

In an embodiment, the optical modulation device 5 is disposed in front of the phase retardation plate 50, and is an active device that may be switched on/off. When the optical modulation device 5 is turned on, the phase may change differently according to position along the x-axis. The optical modulation device 5 can be driven differently based on the image display method of the optical device 1.

An optical device 1 according to an exemplary embodiment of the present disclosure will now be described with reference to FIG. 2.

Figure 2:
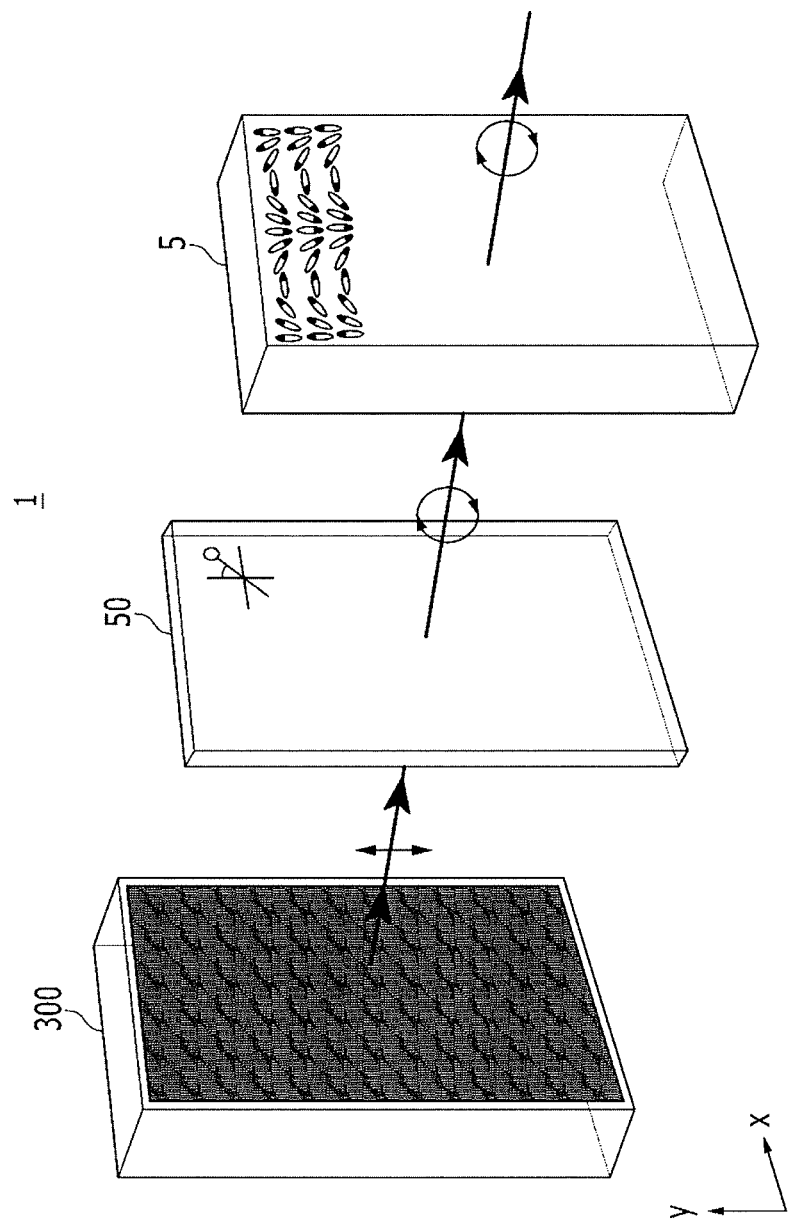
FIG. 2 is an exploded perspective view of an optical device that is driven according to an exemplary embodiment of the present disclosure.

FIG. 2 is an exploded perspective view of the optical device 1 that includes the optical modulation device 5 according to an exemplary embodiment of the present disclosure. As shown in FIG. 2, light emitted from the display panel 300 passes through the polarizer 302 and the phase retardation plate 50 and then passes into the optical modulation device 5.

According to an embodiment, the display panel 300 is driven by the spatial division method, and some of a plurality of pixels of the display panel 300 may emit light corresponding to one viewpoint image, and the other remaining pixels may emit light corresponding to the other viewpoint image.

According to an exemplary embodiment of the present disclosure, the optical modulation device 5 forms a forward phase slope in which a phase retardation value changes from 0 to 2π radian along the x-axis direction and a backward phase slope in which the phase retardation value is changes from 2π to 0 radian along the x-axis direction.

The optical modulation device 5 may alternately form the forward phase slope and the backward phase slope along the x-axis direction. The forward phase slope and the backward phase slope are formed adjacent to each other to form a lens. Accordingly, the optical modulation device 5 may form a plurality of lenses along the x-axis direction.

Light of the display panel 300 passing through the optical modulation device 5 is transmitted to both eyes of a user, so that the user may perceive a 3D image due to binocular disparity. This will be described with reference to FIG. 18 below.

An optical modulation device 5 according to an exemplary embodiment of the present disclosure will now be described with reference to FIGS. 3 to 5 and the above-described drawings.

Figure 3:
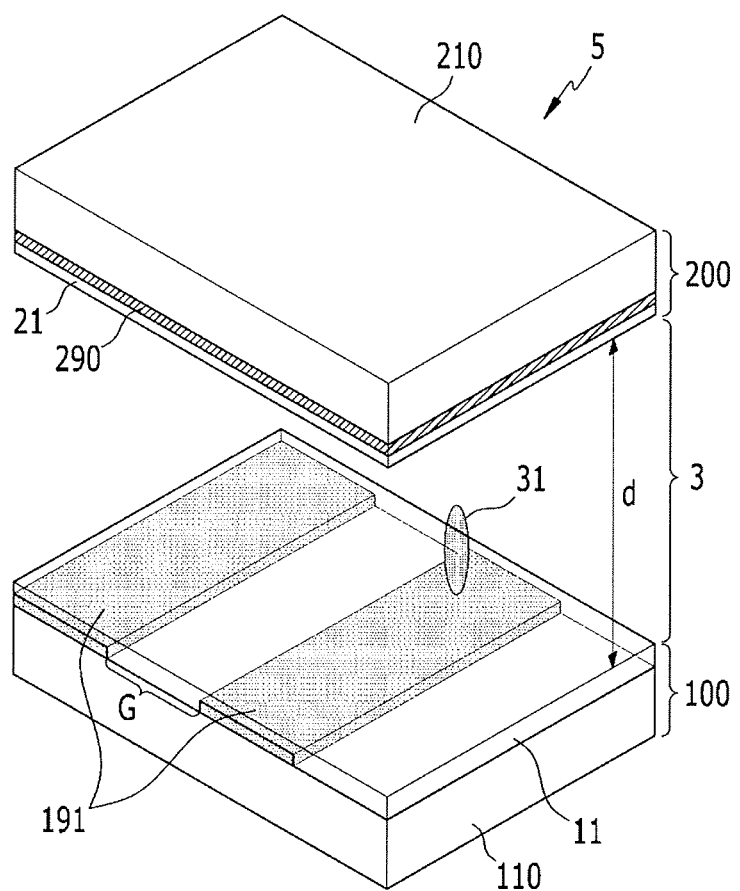
FIG. 3 is a perspective view of an optical modulation device according to an exemplary embodiment of the present disclosure.
Figure 4:
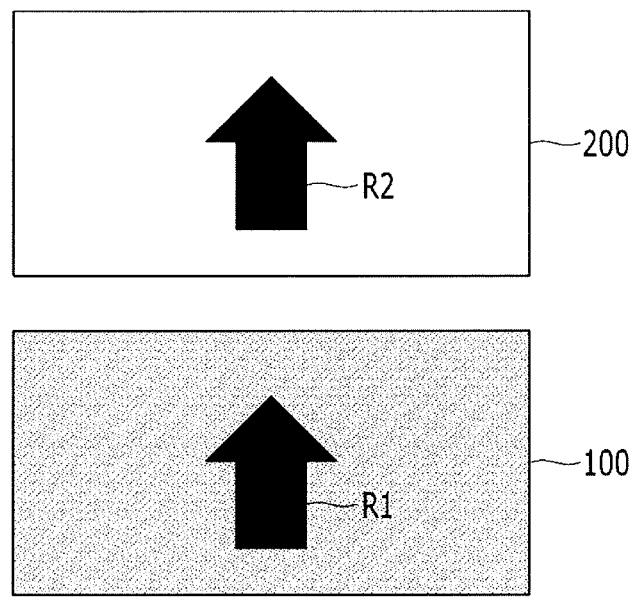
FIG. 4 is a top plan view that illustrates alignment directions in first and second plates included in an optical modulation device according to an exemplary embodiment of the present disclosure.
Figure 5:
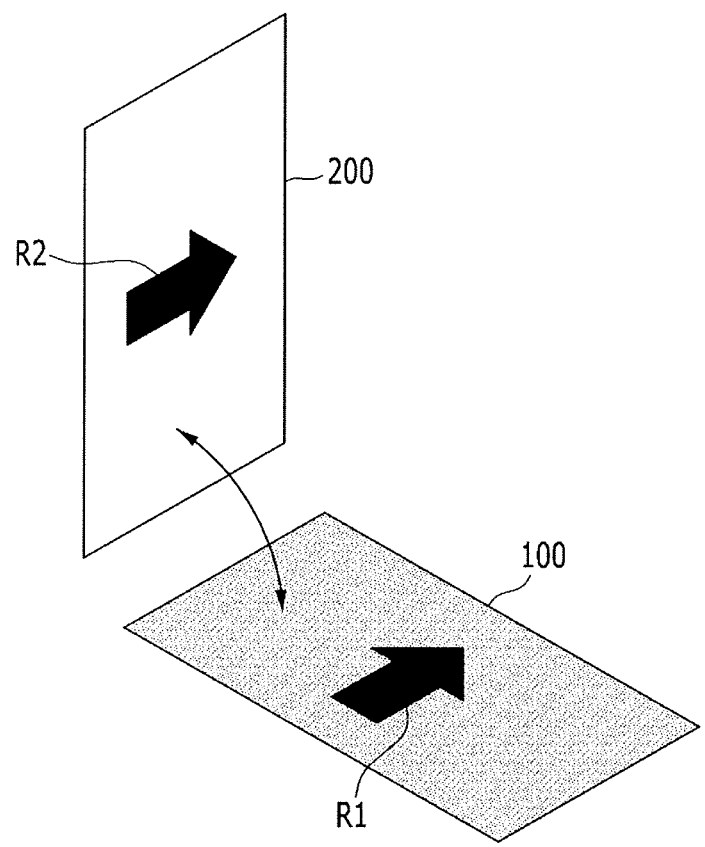
FIG. 5 illustrates a process of combining the first and second plates shown in FIG. 3.

FIG. 3 is a perspective view of an optical modulation device according to an exemplary embodiment of the present disclosure, FIG. 4 is a top plan view that illustrates alignment directions in first and second plates included in an optical modulation device according to an exemplary embodiment of the present disclosure, and FIG. 5 illustrates a process pf combining the first and second plates shown in FIG. 3.

Referring to FIG. 3, an optical modulation device 5 according to an exemplary embodiment of the present disclosure includes a first plate 100 and a second plate 200 that face each other, and a liquid crystal layer 3 disposed therebetween.

According to an embodiment, the first plate 100 includes a first substrate 110 that may be made from glass, plastic, etc. The first substrate 110 may be rigid or flexible, and it may be flat. In addition, at least part of the first substrate 110 may be bent.

A plurality of lower electrodes 191 are disposed on the first substrate 110. The lower electrode 191 includes a conductive material, and may include a transparent conductive material such as ITO and IZO, a metal, etc. The lower electrode 191 can receive a voltage from a voltage applying unit, and different lower electrodes 191 can receive different voltages.

According to an embodiment, the plurality of lower electrodes 191 are arranged in a predetermined direction, such as the x-axis direction, and each lower electrode 191 is elongated in a direction perpendicular to the arranged direction, such as the y-axis direction.

According to an embodiment, a width of a space G between adjacent lower electrodes 191 can vary depending on a design of the optical modulation device. A ratio of a width of the lower electrode 191 and the width of the space G adjacent to the lower electrode 191 is approximately N:1, where N is a real number of 1 or more.

According to an embodiment, the second plate 200 includes a second substrate 210 that may be made of glass, plastic, etc. The second substrate 210 may be rigid or flexible, and it may be flat or at least a part thereof may be bent.

An upper electrode 290 is disposed on the second substrate 210. The upper electrode 290 includes a conductive material, and it may include a transparent conductive material such as ITO and IZO, a metal, etc. The upper electrode 290 can receive a predetermined voltage from a voltage applying unit. According to an embodiment, the upper electrode 290 formed on the entire second substrate 210, and is patterned to have a plurality of separated portions.

The liquid crystal layer 3 includes a plurality of liquid crystal molecules 31. The liquid crystal molecules 31 have negative dielectric anisotropy so that they can align in a direction transverse to that of an electric field generated in the liquid crystal layer 3. The liquid crystal molecules 31 are substantially vertically aligned with respect to the first and second plates 100, 200 when no electric field is generated in the liquid crystal layer 3, and may form pre-tilts in a predetermined direction. The liquid crystal molecules 31 may be nematic liquid crystal molecules.

According to an embodiment, a height d of a cell gap of the liquid crystal layer 3 substantially satisfies Equation 1 with respect to light having a predetermined wavelength λ. Accordingly, the optical modulation device 1 according to an exemplary embodiment of the present disclosure substantially functions as a half-wavelength plate and can be used as a diffraction grid, a lens, etc.

$$\frac{\lambda}{2} \times 1.3 \geq \Delta nd \geq \frac{\lambda}{2} \qquad \text{(Equation 1)}$$

In Equation 1, Δnd is a phase retardation value of light passing through the liquid crystal layer 3, where n is related to the refractive index and d is the cell gap.

A first aligner 11 is disposed on an inner surface of the first plate 100, and a second aligner 21 is disposed on an inner surface of the second plate 200. According to an embodiment, the first aligner 11 and the second aligner 21 are vertical alignment layers and have been provided with an alignment force through various methods, such as a rubbing process or a photo-alignment process, to determine pre-tilt directions of the liquid crystal molecules 31 close to the first and second plates 100 and 200. In the case of a rubbing process, the vertical alignment layer may be an organic vertical alignment layer. In the case of a photo-alignment process, a photo-polymerization material may be formed by irradiating light, such as ultraviolet light, after coating an alignment material that includes a photosensitive polymer material on the inner surfaces of the first and second plates 100 and 200.

Referring to FIG. 4, alignment directions R1 and R2 of two aligners 11 and 21 disposed on the inner surfaces of the first and second plates 100 and 200 are substantially parallel to each other. Further, the alignment directions R1 and R2 of the aligners 11 and 21 are constant.

A misalignment of the first plate 100 and the second plate 200 may occur, and a difference between the azimuthal angle of the first aligner 11 of the first plate 100 and the azimuthal angle of the second aligner 21 of the second plate 200 may be approximately ±5, but embodiments are not limited thereto.

Referring to FIG. 5, the optical modulation device 1 according to an exemplary embodiment of the present disclosure can be formed by aligning and assembling the first plate 100 and the second plate 200.

Unlike those shown in FIG. 3, vertical positions of the first plate 100 and the second plate 200 may change.

As such, the aligners 11 and 21 on the first and second plate 100 and 200 of the optical modulation device 5 according to an exemplary embodiment of the present disclosure are parallel to each other, and since the alignment directions of the aligners 11 and 21 are substantially constant, the process of aligning an optical modulation device can be simplified and thus the process of manufacturing the optical modulation device 5 can be simplified due to a less complicated alignment process. Accordingly, it is possible to prevent defects due to misalignment of an optical modulation device or an optical device that includes the same. Accordingly, an optical modulation device may be made larger.

Next, an operation of an optical modulation device according to an exemplary embodiment of the present disclosure will be described with reference to FIGS. 6 to 9 and the above-described drawings.

Figure 6:
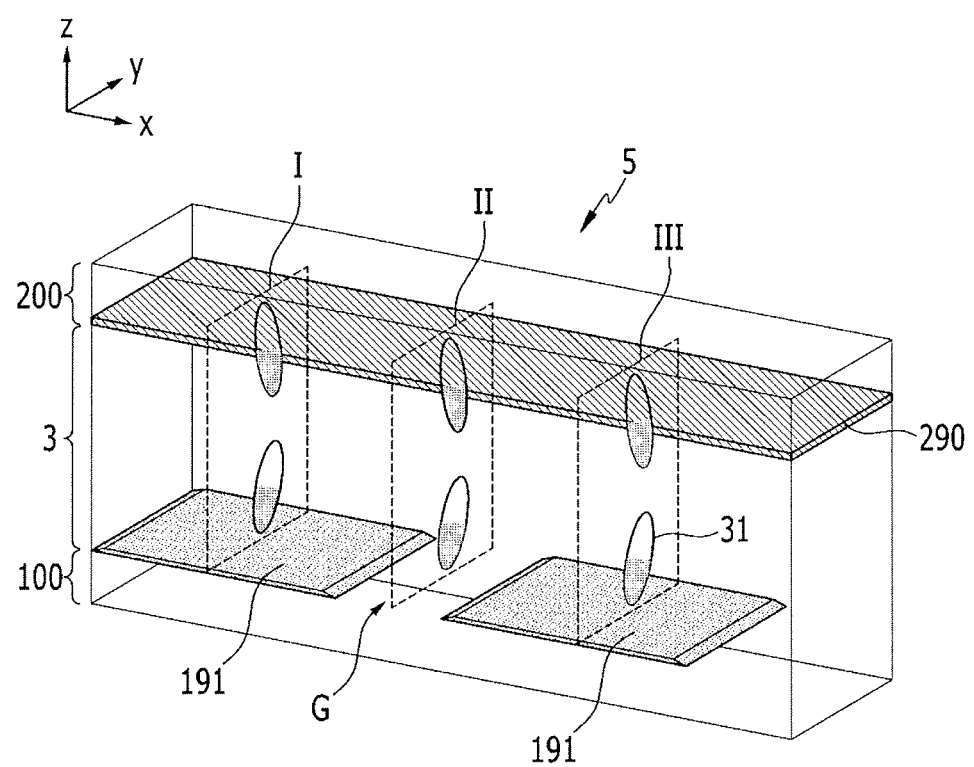
FIG. 6 is a perspective view that illustrates alignment of liquid crystal molecules when there is no voltage difference between first and second plates of an optical modulation device according to an exemplary embodiment of the present disclosure.
Figure 7:
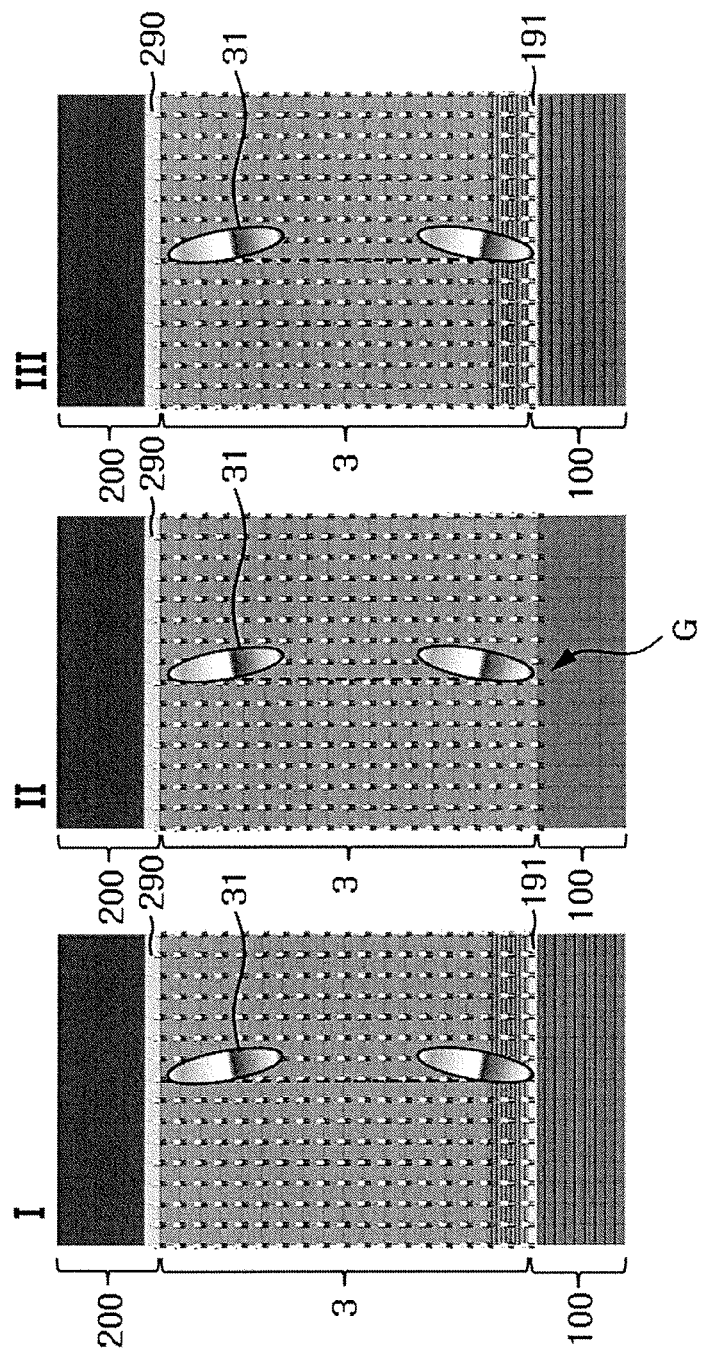
FIG. 7 shows cross-sectional views of an optical modulation device of FIG. 6 taken along planes I, II, and III.
Figure 8:
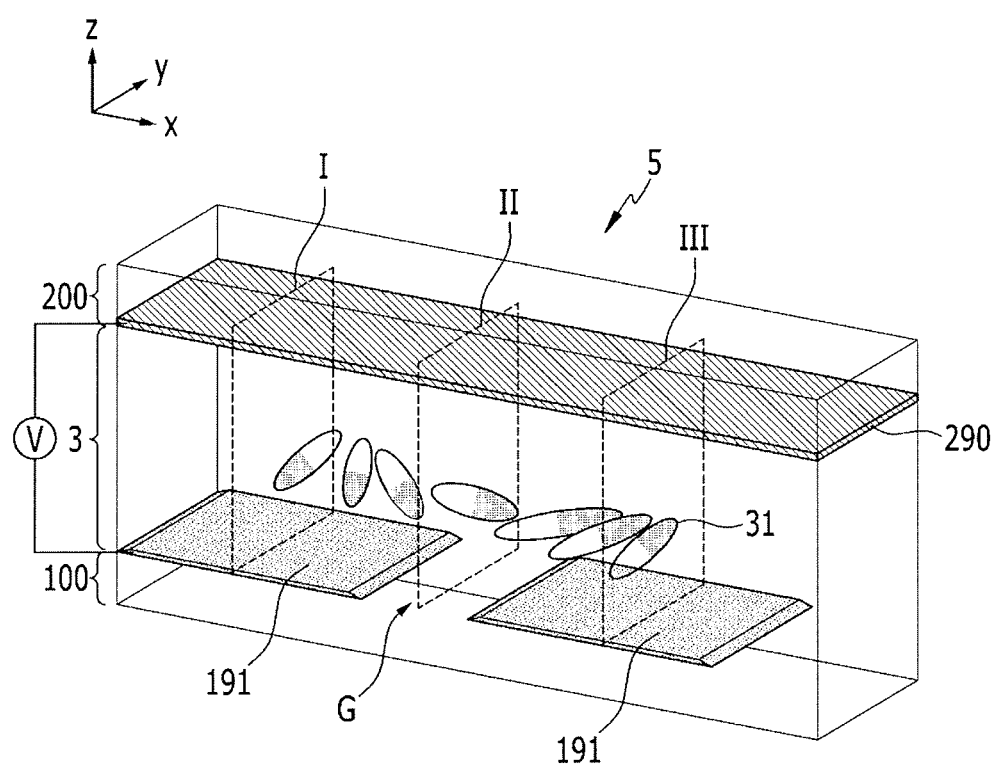
FIG. 8 is a perspective view that illustrates alignment of liquid crystal molecules when there is a voltage difference between first and second plates of an optical modulation device according to an exemplary embodiment of the present disclosure.
Figure 9:
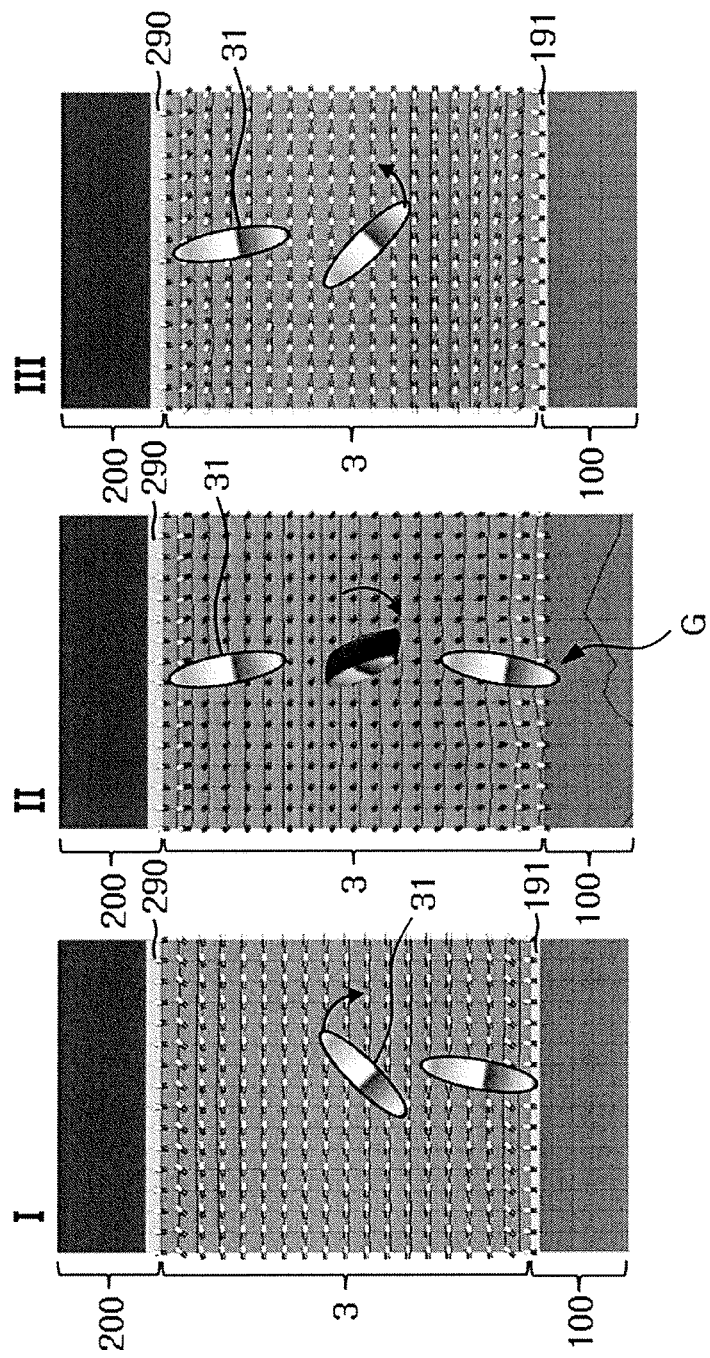
FIG. 9 shows cross-sectional views of an optical modulation device of FIG. 8 taken along planes I, II, and III.

FIG. 6 is a perspective view that illustrates alignment of liquid crystal molecules when there is no voltage difference between first and second plates of an optical modulation device according to an exemplary embodiment of the present disclosure, FIG. 7 shows cross-sectional views of an optical modulation device of FIG. 6 taken along planes I, II, and III, FIG. 8 is a perspective view that illustrates alignment of liquid crystal molecules when there is a voltage difference between first and second plates of an optical modulation device according to an exemplary embodiment of the present disclosure, and FIG. 9 shows cross-sectional views of an optical modulation device of FIG. 8 taken along planes I, II, and III.

Referring to FIGS. 6 and 7, when no voltage difference is generated between the lower electrodes 191 and the upper electrode 290, and thus no electric field is generated in the liquid crystal layer 3, the liquid crystal molecules 31 are aligned with an initial pre-tilt. FIG. 7 illustrates a cross-sectional view taken along plane I corresponding to a lower electrodes 191 shown in FIG. 6, a cross-sectional view taken along plane II corresponding to the space G between two adjacent lower electrodes 191, and a cross-sectional view taken along plane III corresponding to a lower electrode 191 adjacent to the lower electrode 191 of plane I. FIG. 7 shows that the alignment of the liquid crystal molecules 31 is substantially constant.

FIG. 7 shows that some liquid crystal molecules 31 extend into a region of the first plate 100 or second plate 200, but this is for convenience of illustration. However, the liquid crystal molecules 31 do not substantially extend into the region of the first plate 100 or the second plate 200, and this is the same for the drawings below.

Since the liquid crystal molecules 31 adjacent to the first and second plates 100 and 200 are initially aligned according to parallel alignment directions of the aligners 11 and 21, the pre-tilt direction of the liquid crystal molecules 31 adjacent to the first plate 100 are opposite to the pre-tilt direction of the liquid crystal molecules 31 adjacent to the second plate 200, rather than parallel to each other. That is, the liquid crystal molecules 31 adjacent to the first plate 100 and the liquid crystal molecules 31 adjacent to the second plate 200 may be tilted symmetrically to each other with respect a horizontal center line that extends along the center of the liquid crystal layer 3 of the cross-sectional view. For example, when the liquid crystal molecules 31 adjacent to the first plate 100 are tilted to the right, the liquid crystal molecules 31 adjacent to the second plate 200 may be tilted to the left.

Referring to FIGS. 8 and 9, when a voltage difference greater than or equal to a threshold voltage is applied between the electrode 191 and the electrode 290, immediately after the electric field is generated in the liquid crystal layer 3, the liquid crystal molecules 31 start to tilt in a direction perpendicular to the direction of the electric field. As a result, as shown in FIGS. 8 and 9, most of the liquid crystal molecules 31 tilt substantially parallel to the surface of the first plate 100 and the second plate 200 to form an in-plane alignment, and long axes of the liquid crystal molecules 31 rotate and align in-plane. The in-plane alignment means that the long axes of the liquid crystal molecules 31 are aligned parallel to the surface of the first and second plates 100 and 200.

In this case, the in-plane rotation angles, that is, the azimuthal angles of the liquid crystal molecules 31, can vary depending on the voltages applied to the corresponding lower electrodes 191 and upper electrode 290, and as a result, the in-plane rotation angles can spirally change as a function of position in the x-axis direction.

Next, a driving method and operation of the optical modulation device 5 according to an exemplary embodiment of the present disclosure will be described with reference to FIGS. 10 to 17 and the above-described drawings. However, the driving method described with reference to FIGS. 10 to 17 is an example in which the optical device 1 drives the optical modulation device 5 to display an autostereoscopic image, and in other embodiments, the driving method of the optical modulation device 5 for displaying an autostereoscopic image is not limited thereto.

A method of implementing a forward phase slope using the optical modulation device 5 according to an exemplary embodiment of the present disclosure will now be described with reference to FIGS. 10 to 14 and the above-described drawings.

Figure 10:
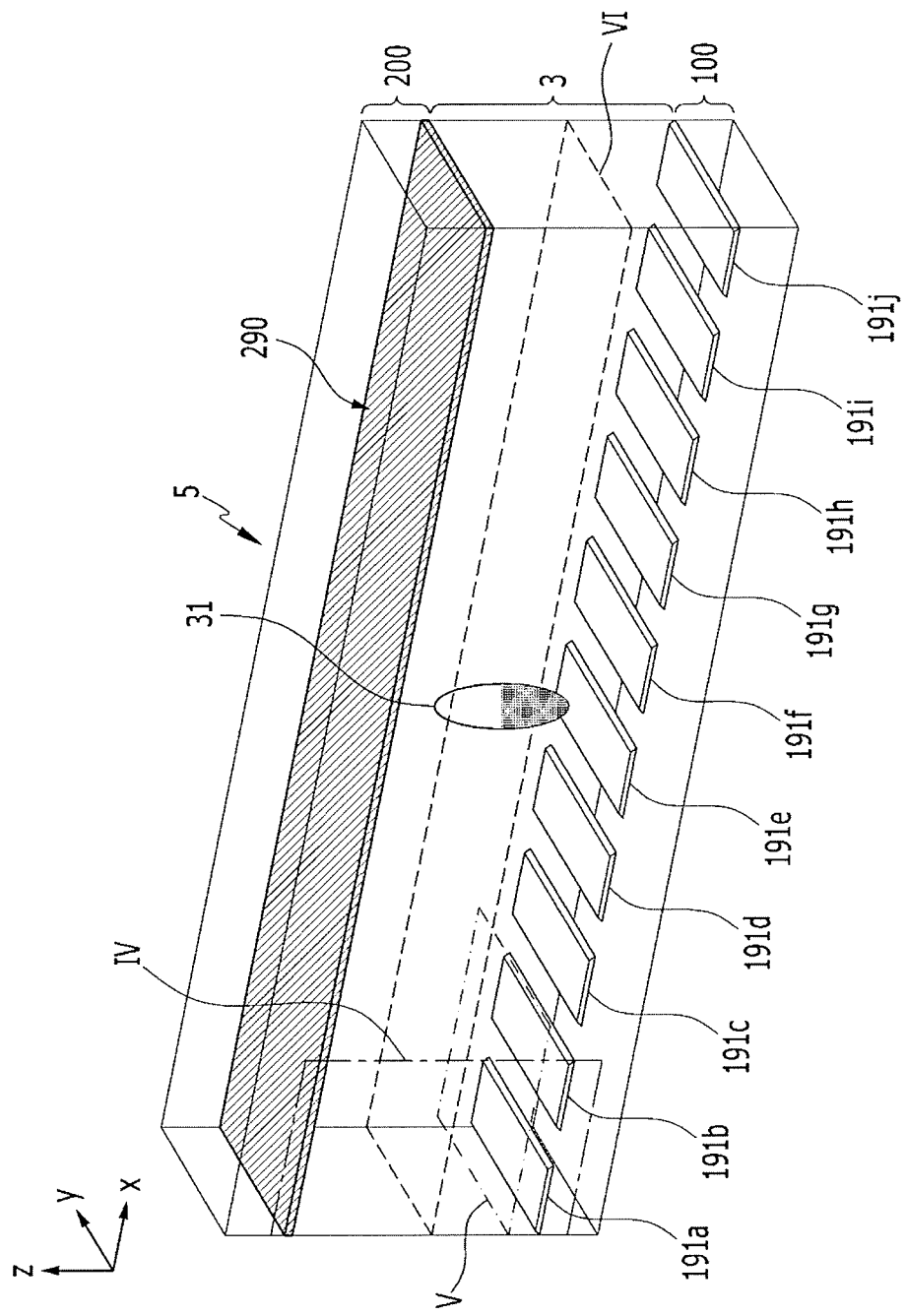
FIG. 10 is a perspective view of an optical modulation device according to an exemplary embodiment of the present disclosure.

FIG. 10 illustrates the optical modulation device 5 containing liquid crystals according to an exemplary embodiment of the present disclosure, and in an exemplary embodiment, has the same structure as the exemplary embodiment described above. According to an embodiment, the optical modulation device 5 includes a plurality of unit areas, and each unit area includes at least one lower electrode 191. A lens that includes a forward phase slope and a backward phase slope may be formed by applying a voltage to first to tenth electrodes 191a-191j.

In an exemplary embodiment, each unit area includes one lower electrode 191, and two lower electrodes 191a and 191b disposed in two adjacent unit areas, respectively, will be described. The two lower electrodes 191a and 191b are referred to as a first electrode 191a and a second electrode 191b, respectively.

Figure 12:
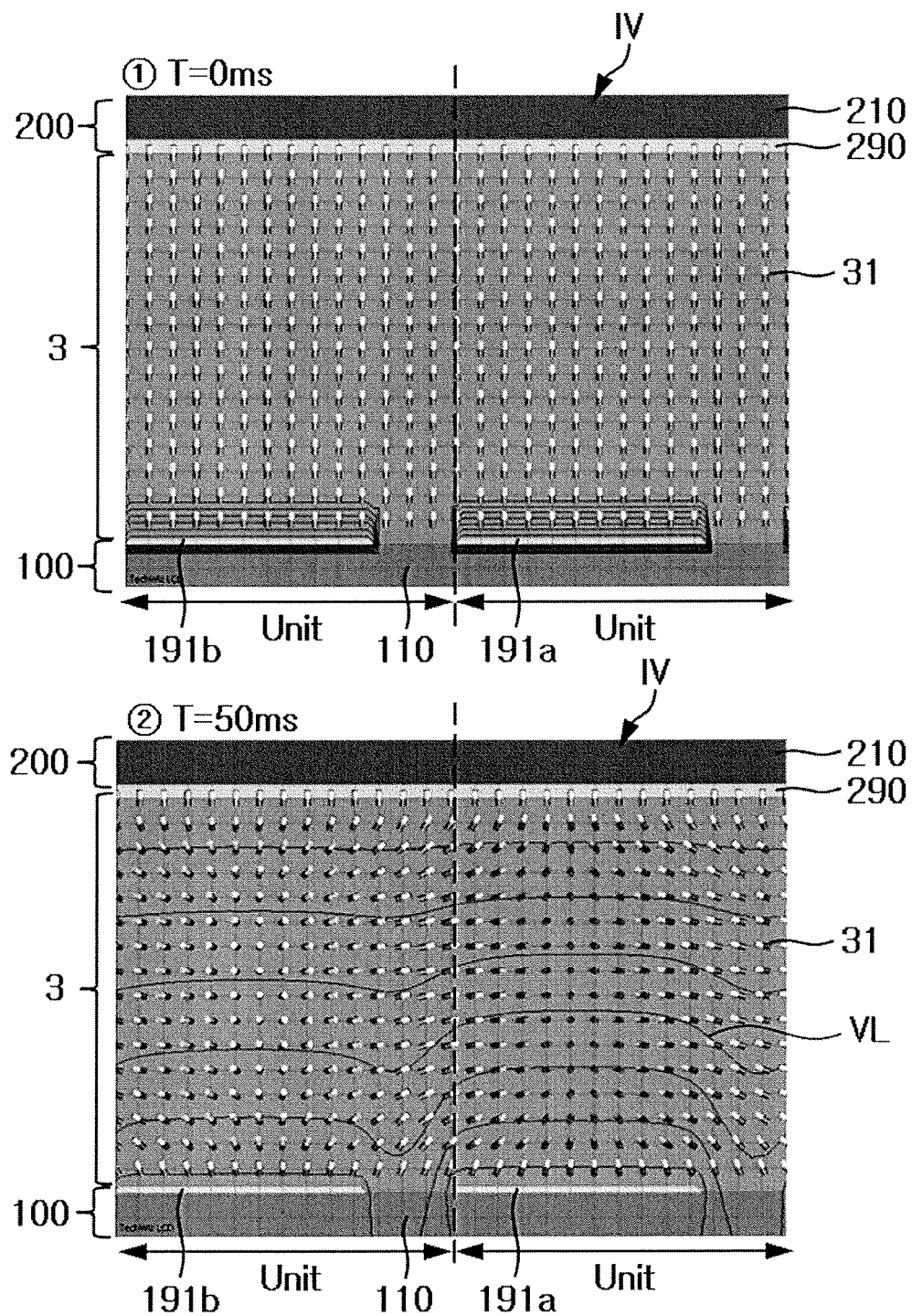
FIG. 12 shows cross-sectional views taken along plane IV of FIG. 10, which illustrate alignment of liquid crystal molecules before a voltage difference is applied to a first plate and second plate of an optical modulation device according to an exemplary embodiment of the present disclosure and after a driving signal of a first step is applied thereto.

Referring to the upper view of FIG. 12, when the same voltage is applied to the first and second electrodes 191a and 191b and the upper electrode 290, the liquid crystal molecules 31 are substantially aligned in a direction approximately perpendicular to planes of the first and second plates 100 and 200, and form pre-tilts depending on the alignment directions of the first and second plates 100 and 200, as described above. In this case, a voltage of 0 V with respect to the voltage of the upper electrode 290 can be applied to the first and second electrodes 191a and 191b, and a voltage equal to or less than a threshold voltage Vth at which the alignment of the liquid crystal molecules 31 starts to change may be applied thereto.

Figure 11:
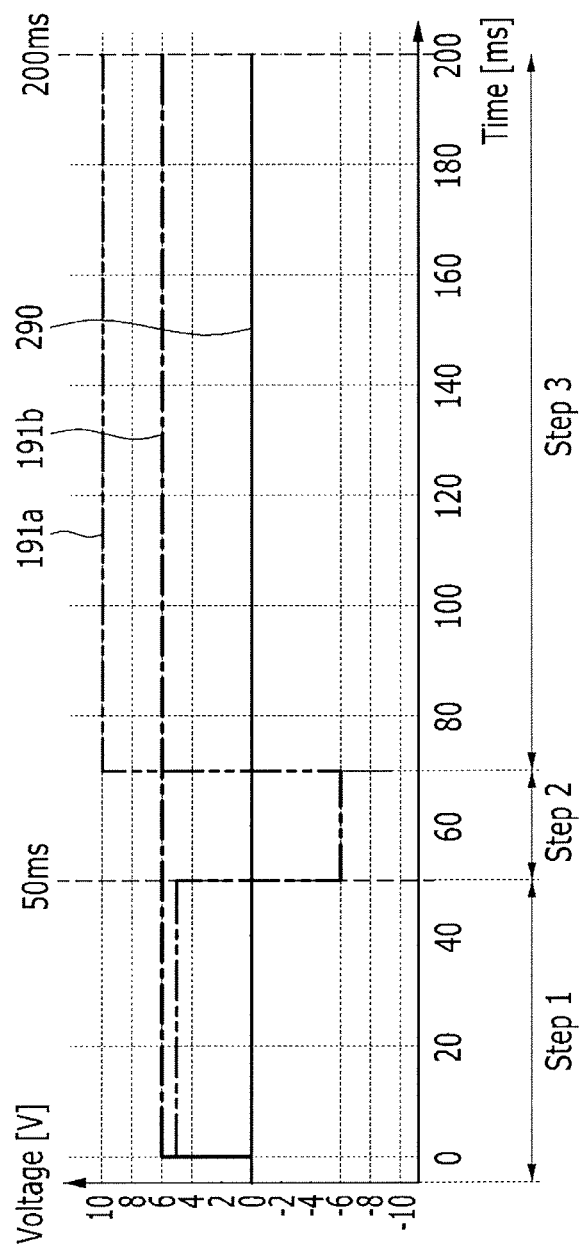
FIG. 11 is a timing diagram of driving signals of an optical modulation device according to an exemplary embodiment of the present disclosure.

Referring to FIG. 11, first, to implement a forward phase slope in the optical modulation device 5 according to an exemplary embodiment of the present disclosure, adjacent lower electrodes 191a and 191b and the upper electrode 290 can receive a first step (step 1) driving signal for one frame. In the first step (step 1), a voltage difference is formed between the electrodes 191a and 191b and the electrode 290, and a voltage difference forms even between the adjacent first and second electrodes 191a and 191b. For example, the absolute value of a second voltage applied to the second electrode 191b may be greater than the absolute value of a first voltage applied to the first electrode 191a. Further, a third voltage applied to the upper electrode 290 is different from the first and second voltages applied to the lower electrodes 191a and 191b. For example, the third voltage applied to the upper electrode 290 may be less than the absolute values of the first and second voltages applied to the lower electrodes 191a and 191b. For example, voltages of 4 V, 6 V, and 0 V may be respectively applied to the first electrode 191a, the second electrode 191b, and the upper electrode 290.

However, in other embodiments, when a unit area includes a plurality of the lower electrodes 191, the same voltage may be applied to all the plurality of lower electrodes 191 of one unit area, or voltages that sequentially change for a unit of at least one lower electrode 191 may be applied thereto. In this case, voltages that gradually increase for a unit of at least one lower electrode 191 can be applied to the lower electrode 191 of one unit area, and voltages that gradually decrease for a unit of at least one lower electrode 191 may be applied to the lower electrode 191 of an adjacent unit area.

The voltages applied to the lower electrodes 191 of all the units may have a constant positive or negative polarity based on the voltage of the upper electrode 290. Further, the polarity of the voltage applied to the lower electrodes 191 may invert with a cycle of at least one frame.

Figure 13:
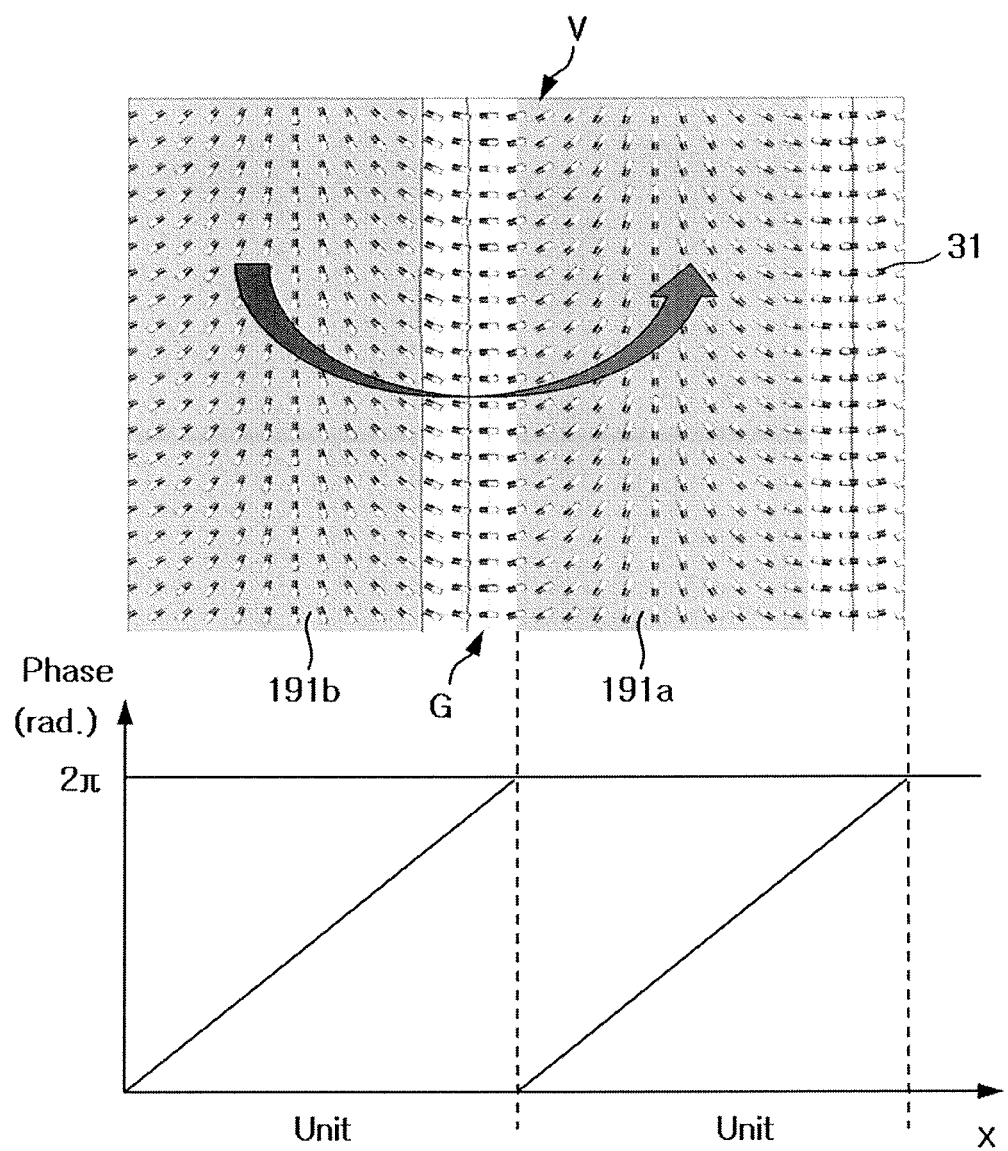
FIG. 13 shows a cross-sectional view taken along plane V of FIG. 10 and a graph of a phase change corresponding to the cross-sectional view, which illustrate alignment of liquid crystal molecules after a driving signal of a first step is applied to an optical modulation device according to an exemplary embodiment of the present disclosure and the liquid crystal molecules have stabilized.
Figure 14:
FIG. 14 illustrates alignment of liquid crystal molecules after a driving signal of a first step is applied to an optical modulation device according to an exemplary embodiment of the present disclosure and the liquid crystal molecules have stabilized.

Then, as in the lower views of FIG. 12 and FIG. 13, the liquid crystal molecules 31 realign according to the electric field generated in the liquid crystal layer 3. More specifically, most of the liquid crystal molecules 31 tilt substantially parallel to the surfaces of the first or second plates 100 and 200 to form an in-plane alignment, while long axes thereof rotate in-plane to form a spiral alignment as shown in FIGS. 13 and 14, and more particularly, to form a u-shaped alignment. In the liquid crystal molecules 31, azimuthal angles of the long axes of the liquid crystal molecules 31 may change from about 0° to about 180° with a cycle of a pitch of the lower electrodes 191. A portion where the azimuthal angles of the long axes of the liquid crystal molecules 31 changes from about 0° to about 180° has a u-shaped alignment.

It can take a certain amount of time until the alignment of the liquid crystal molecules 31 stabilizes after the optical modulation device 5 receives the first step (step 1) driving signal, and the optical modulation device 5 may continuously receive the first step (step 1) driving signal to form a forward phase slope.

Referring to FIG. 13, the liquid crystal molecules 31 rotate 180° along the x-axis direction, and the aligned region may be regarded as one unit area. In a present exemplary embodiment, one unit area may include a space G between adjacent first and second electrodes 191a and 191b.

In general, when the optical axis of a half-wavelength plate rotates in-plane by $\phi$, the phase of the emitted light changes by $2\phi$, and as a result, the phase of the light emitted from one unit area in which the azimuthal angle of the long axes of the liquid crystal molecules 31 has changed to 180° changes from 0 to $2\pi$ radian in the x-axis direction, as shown in FIG. 13. This may be referred to as a forward phase slope. The phase change may repeat for every unit area, and the forward phase slope portion of the lens may be implemented using the optical modulation device 5.

Hereinafter, a method of implementing a backward phase slope using the optical modulation device 5 according to an exemplary embodiment of the present disclosure will be described with reference to FIGS. 15 to 17 and the above-described drawings, particularly, FIGS. 11 to 13.

Figure 15:
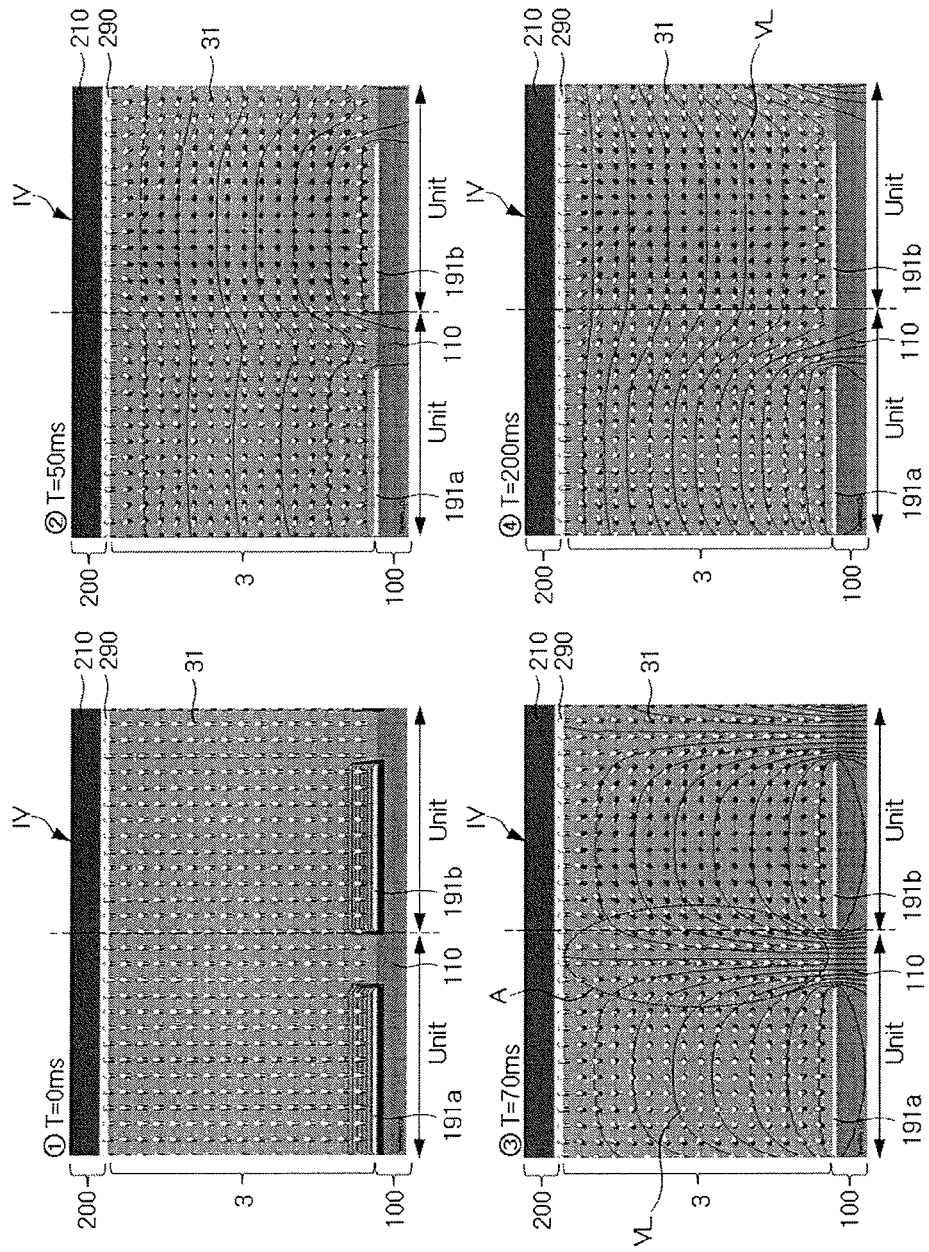
FIG. 15 shows cross-sectional views taken along plane IV of FIG. 10, which s illustrate alignment of liquid crystal molecules before a voltage difference between a first plate and a second plate of an optical modulation device according to an exemplary embodiment of the present disclosure occurs, and after driving signals of steps 1 to 3 are respectively applied thereto.

Referring to an upper left view of FIG. 15, when no voltages are applied to the first and second electrodes 191a and 191b and the upper electrode 290, the liquid crystal molecules 31 are initially aligned in a direction substantially perpendicular to planes of the first and second plates 100 and 200, and form pre-tilts based on the alignment directions of the first and second plates 100 and 200, as described above.

Referring to FIG. 11, above, a certain amount of time, such as 50 ms, elapses after receipt of the first step (step 1)

driving signal, after which the lower electrodes 191a and 191b and the upper electrode 290 receive a second step (step 2) driving signal.

According to embodiments, in the second step (step 2), voltages with opposite polarities with respect to the voltage applied to the upper electrode 290 are applied to the adjacent first and second electrodes 191a and 191b. For example, if the voltage of the upper electrode 290 is 0 V, a voltage of −6 V may be applied to the first electrode 191a and a voltage of 6 V may be applied to the second electrode 191b, and vice versa.

Then, as shown in a lower left diagram of FIG. 15, equipotential lines VL form, the liquid crystal molecules 31 in an area corresponding to the space G between the first and second electrodes 191a and 191b align in the direction substantially perpendicular to the plates 100 and 200, and the in-plane spiral alignment is broken.

A duration of the second step (step 2) may be, for example, about 20 ms, but embodiments are not limited thereto.

However, in other embodiments, when the unit area includes a plurality of lower electrodes 191, the same voltage may be applied to all of the plurality of lower electrodes 191 of one unit area, or voltages that sequentially change for a unit of at least one lower electrode 191 may be applied thereto. The voltages applied to the lower electrodes 191 of adjacent unit areas may have opposite polarities based on the voltage of the upper electrode 290. Further, the polarities of the voltages applied to the lower electrode 191 may invert with a cycle of at least one frame.

A certain amount of time, such as 20 ms, elapses receipt of the driving signal of the second step (step 2), after which the lower electrodes 191a and 191b and the upper electrode 290 receive the third step (step 3) driving signal, and the received driving signal may be maintained for the remaining duration of the corresponding frame.

In the third step (step 3), voltage levels applied to the lower electrodes 191a and 191b and the upper electrode 290 are similar to those applied to the first step (step 1), but the relative magnitudes of the voltages applied to the first electrode 191a and the second electrode 191b may be reversed. That is, according to an embodiment, in the first step (step 1), if the voltage applied to the first electrode 191a is less than the voltage applied to the second electrode 191b, in the third step (step 3), the voltage applied to the first electrode 191a is greater than the voltage applied to the second electrode 191b. For example, in the third step (step 3), voltages of 10 V, 6 V, and 0 V may be applied to the first electrode 191a, the second electrode 191b, and the upper electrode 290, respectively.

Then, as in the lower right view of FIG. 15, the liquid crystal molecules 31 realign according to the electric field generated in the liquid crystal layer 3. More specifically, most of the liquid crystal molecules 31 tilt substantially parallel to the surface of the first or second plate 100 and 200 to form an in-plane alignment, while long axes thereof rotate in-plane to form a spiral alignment as shown in FIGS. 16 and 17, and more particularly, to form an n-shaped alignment. In the liquid crystal layer 3, azimuthal angles of the long axes of the liquid crystal molecules 31 change from about 180° to about 0° on a cycle with a pitch of the lower electrode 191. A portion where the azimuthal angles of the long axes of the liquid crystal molecules 31 change from about 180° to about 0° has an n-shaped alignment.

It can take a certain amount of time until the alignment of the liquid crystal molecules 31 stabilizes after the optical modulation device 5 receives the third step (step 3) driving signal, and the optical modulation device 5 continuously receive the third step (step 3) driving signal to form a backward phase slope.

Figure 16:
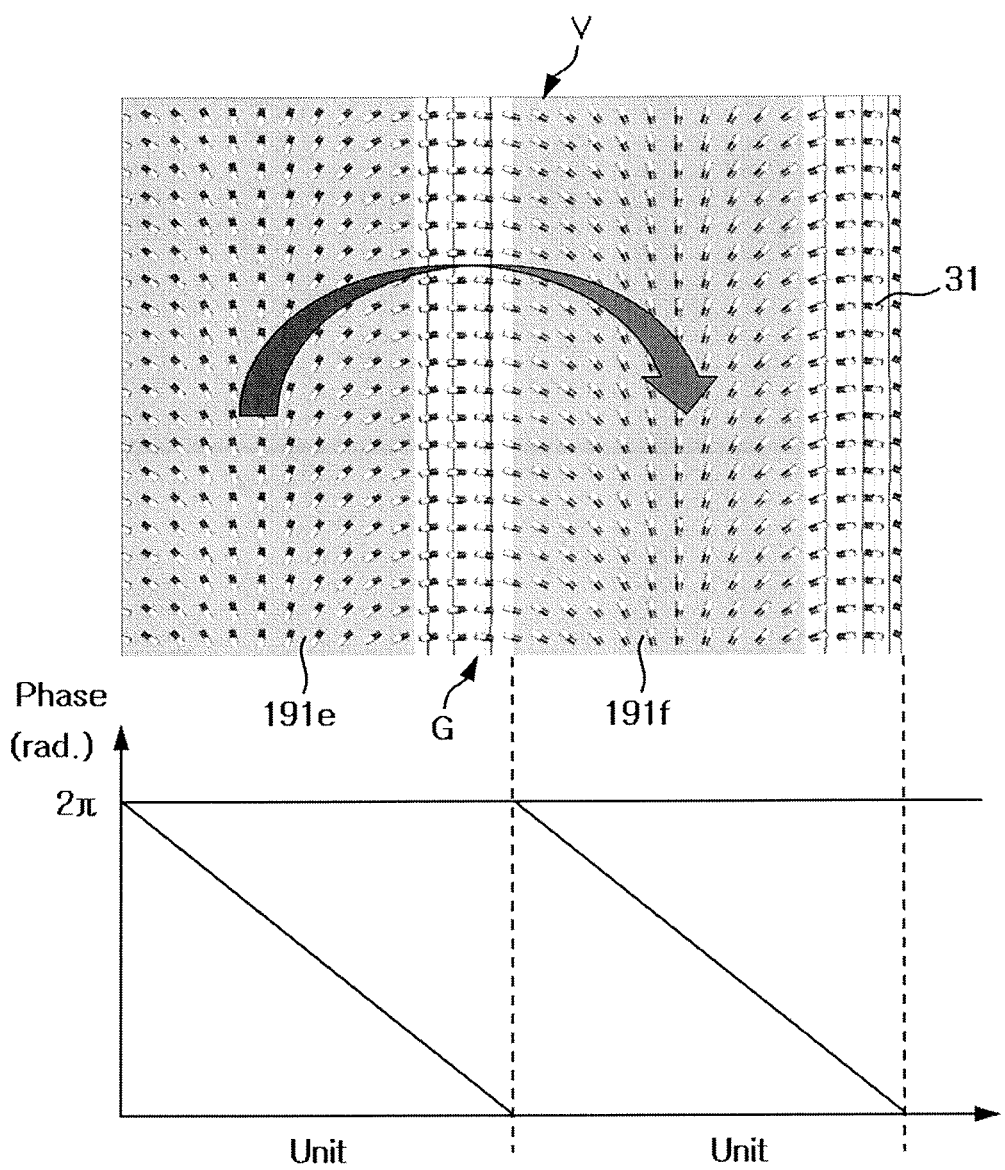
FIGS. 16 and 17 are cross-sectional views taken along plane V of FIG. 10, which illustrate alignment of liquid crystal molecules when the liquid crystal molecules have stabilized state after driving signals of steps 1 to 3 are sequentially applied to an optical modulation device according to an exemplary embodiment of the present disclosure.
Figure 17:

In general, when an optical axis of a half-wavelength plate rotates in-plane by $\phi$, the phase of the emitted light changes by $2\phi$, and as a result, the phase of the light emitted from one unit area in which the azimuthal angle of the long axes of the liquid crystal molecules 31 has changed to 180° changes from $2\pi$ to 0 radian in the x-axis direction, as shown in FIG. 16. This is referred to as a backward phase slope. The phase change may repeat for every unit area, and the backward phase slope portion of the lens may be implemented using the optical modulation device 5.

Since the principles of a method of implementing a backward phase slope are the same as that of a method of implementing a forward phase slope, a repeated detailed description thereof is omitted.

As such, according to an exemplary embodiment of the present disclosure, the in-plane rotation angle of the liquid crystal molecules 31 can be easily controlled by a method of applying a driving signal to variously modulate an optical phase and form various light diffraction angles.

Figure 18:
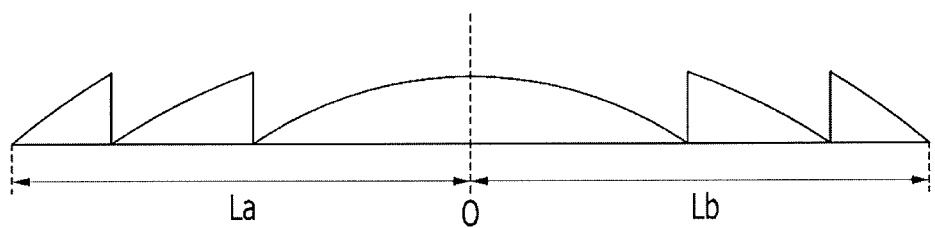
FIG. 18 illustrates a phase change according to a position of a lens that may be implemented by an optical modulation device according to an exemplary embodiment of the present disclosure.

FIG. 18 illustrates a phase change according to a position of a lens that may be implemented by an optical modulation device 5 and a phase retardation plate 50 according to the exemplary embodiment of the present disclosure.

According to an exemplary embodiment of the present disclosure, since the forward phase slope and the backward phase slope may be implemented based on a circular polarization direction of light incident to the optical modulation device 5, a lens can be formed. FIG. 18 illustrates a phase change as a function of position in a Fresnel lens as an example of a lens that can be implemented by the optical modulation device 5. A Fresnel lens is a lens that has optical characteristics of a Fresnel zone plate, and since a phase distribution repeats periodically, the effective phase retardation may be the same as or similar to that of a solid convex lens or a green lens.

As shown in FIG. 18, based on the center 0 of one Fresnel lens, a left portion La includes a plurality of forward phase slope areas of which x-axis direction widths may differ from each other, and a right portion Lb includes a plurality of backward phase slope areas of which x-axis direction widths may differ from each other. Therefore, the first step (step 1) driving signal described above is applied to a portion of the optical modulation device 5 corresponding to the left portion La of the Fresnel lens to form the forward phase slope, and the first step (step 1), second step (step 2), and third step (step 3) driving signals described above are sequentially applied to a portion of the optical modulation device 5 corresponding to the right portion Lb of the Fresnel lens to form the backward phase slope.

The plurality of forward phase slopes included in the left portion Lb of the Fresnel lens may have widths that differ according to position, and to this end, the widths of the lower electrodes 191 that correspond to each forward phase slope and/or the number of lower electrodes 191 included in one unit area may be properly adjusted. Similarly, the plurality of backward phase slopes included in the right portion Lb of the Fresnel lens may have widths that differ according to position, and to this end, the widths of the lower electrodes 191 that correspond to each backward phase slope and/or the number of lower electrodes 191 included in one unit may be properly adjusted.

When the voltages applied to the lower electrodes 191 and the upper electrode 290 are adjusted, a phase curvature of the Fresnel lens may also change.

An optical modulation device according to embodiments of the disclosure may function as a lens and may be used with an optical device, such as a 3D image display device.

An optical device 1 that is driven by another exemplary embodiment of the present disclosure will now be described with reference to FIGS. 19 to 25.

Figure 19:
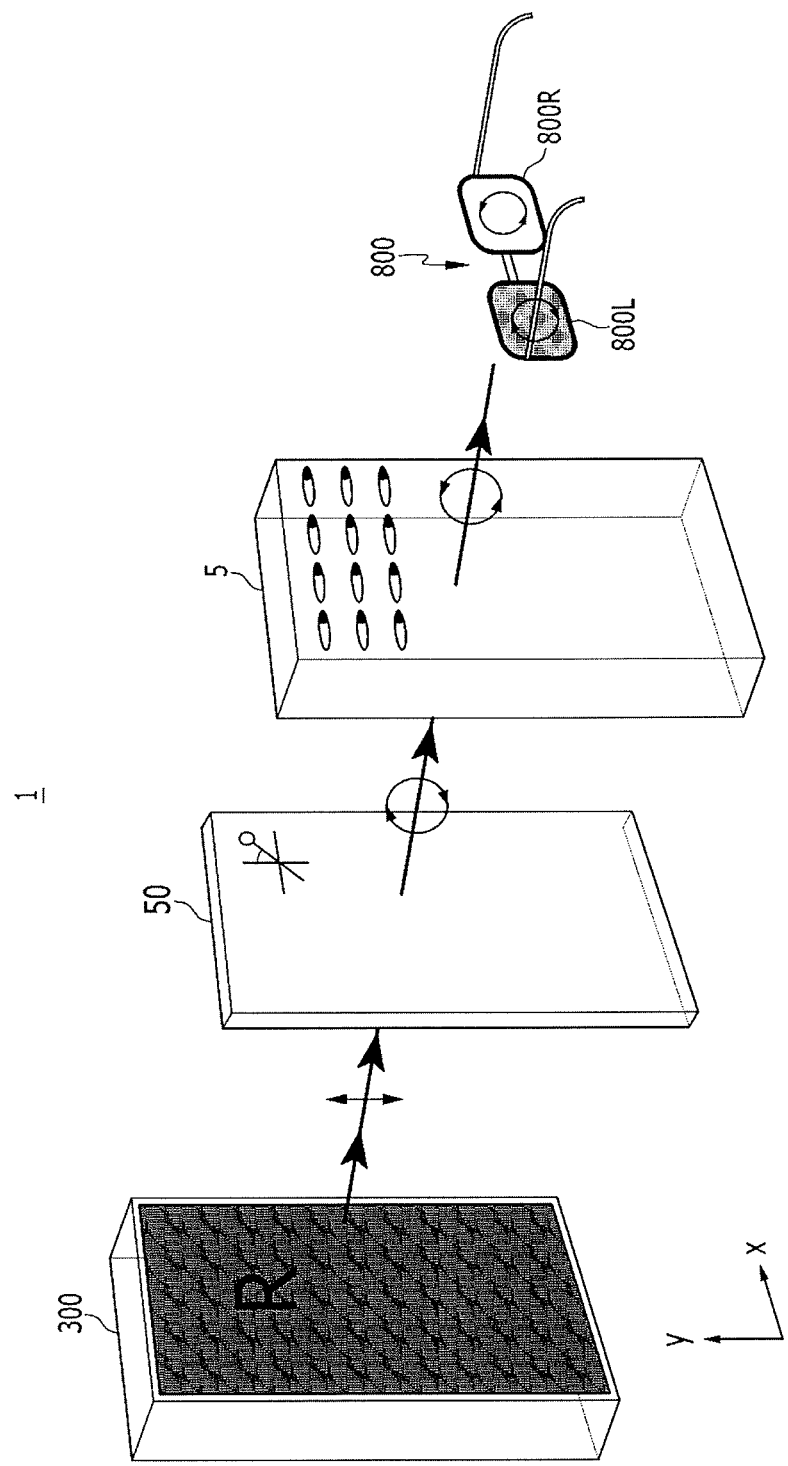
FIGS. 19 and 20 are exploded perspective views of an optical device driven according to another exemplary embodiment of the present disclosure.
Figure 20:
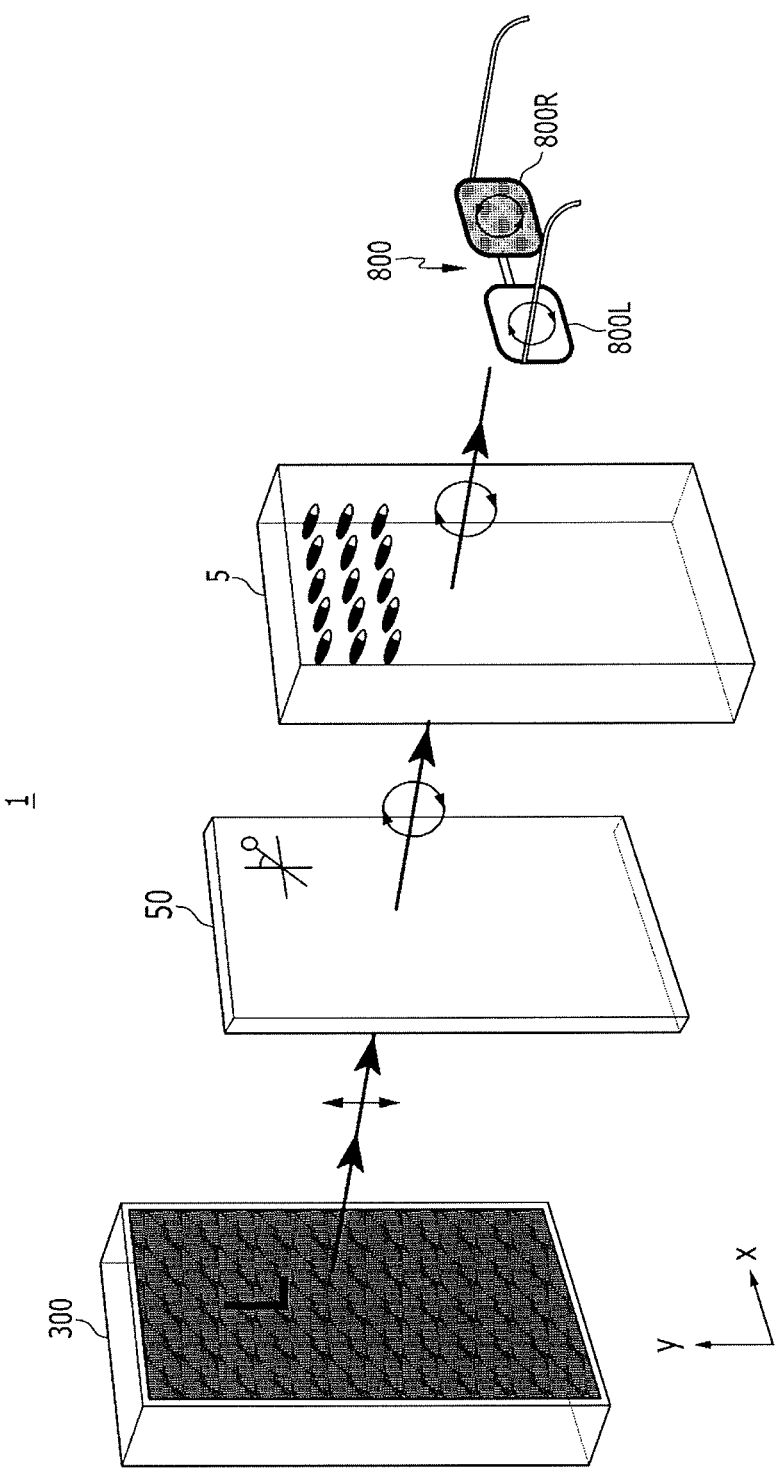

FIGS. 19 and 20 are exploded perspective views of an optical device 1 that is driven by another exemplary embodiment of the present disclosure. According to another exemplary embodiment of the present disclosure, the optical device 1 can display stereoscopic images through a temporal division method. In this case, a user perceives images received by both eyes through polarized glasses 800. The polarized glasses 800 include a first polarization filter 800L which transmits a first image (L) therethrough and a second polarization filter 800R which transmits a second image (R) therethrough. The user may perceive an image displayed on the display panel 300 as a 3D image due to binocular disparity.

As shown in FIG. 19, the display panel 300 displays a first image. Light of the first image displayed on the display panel 300 is linearly polarized in the y-axis direction by the polarizer 302. Then, the first image light that is linearly polarized in the y-axis direction passes through the phase retardation plate 50 and becomes left circularly polarized.

According to another exemplary embodiment of the present disclosure, when the display panel 300 displays the first image, most liquid crystal molecules 31 of the optical modulation device 5 tilt substantially parallel to the surfaces of the first and second plates 100 and 200 to form an in-plane alignment, and most of long axes of the liquid crystal molecules 31 are parallel to the x-axis.

The optical modulation device 5 in which most of long axes of the liquid crystal molecules 31 are parallel to the x-axis changes polarization characteristics of light received from the display panel 300. For example, the optical modulation device 5 changes a direction of the circularly polarized light. That is, left circularly polarized light of the first image passes through the optical modulation device 5 to become right circularly polarized.

Then, right circularly polarized light of the first image passes through the right eye filter 800R of the polarized glasses 800, but is blocked by the left eye filter 800L thereof, such that the first image may be perceived by a right eye of the user.

Further, as shown in FIG. 20, the display panel 300 displays a second image. Light of the second image displayed on the display panel 300 is linearly polarized in the y-axis direction by the polarizer 302. Then, the second image light that is linearly polarized in the y-axis direction passes through the phase retardation plate 50 and becomes left-circularly polarized.

According to another exemplary embodiment of the present disclosure, when the display panel 300 displays the second image, the liquid crystal molecules 31 of the optical modulation device 5 tilt in the direction perpendicular to the surfaces of the first and second plates 100 and 200, and most of long axes of the liquid crystal molecules 31 are arranged in the same direction.

The optical modulation device 5 in which most of the liquid crystal molecules 31 are tilted in the direction perpendicular to the surfaces of the first or second plates 100 and 200 emits light received from the display panel 300 as is, without changing the polarization characteristics of the light.

Then, left circularly polarized light of the second image passes through the left eye filter 800L of the polarized glasses 800, but is blocked by the right eye filter 800R thereof, such that the second image can be perceived by a left eye of the user.

Accordingly, the user views the right circularly polarized first image received through the right eye filter 800R of the polarized glasses 800 with the right eye, and the user views the left circularly polarized second image received through the left eye filter 800L of the polarized glasses 800 with the left eye. As a result, the user may perceive a 3D effect due to binocular disparity.

The optical modulation device 5 that is driven according to another exemplary embodiment described in FIGS. 19 and 20 will now be described in detail with reference to FIGS. 10 and 21 to 23.

As shown in FIG. 10, the optical modulation device 5 may include at least one lower electrodes 191a-191j. According to an embodiment, the first to tenth electrodes 191a-191j are continuously arranged along the x-axis direction, and extend in the y-axis direction. In a present exemplary embodiment, it may be assumed that driving signals are applied to the first to tenth electrodes 191a-191j included in one lens.

Figure 21:
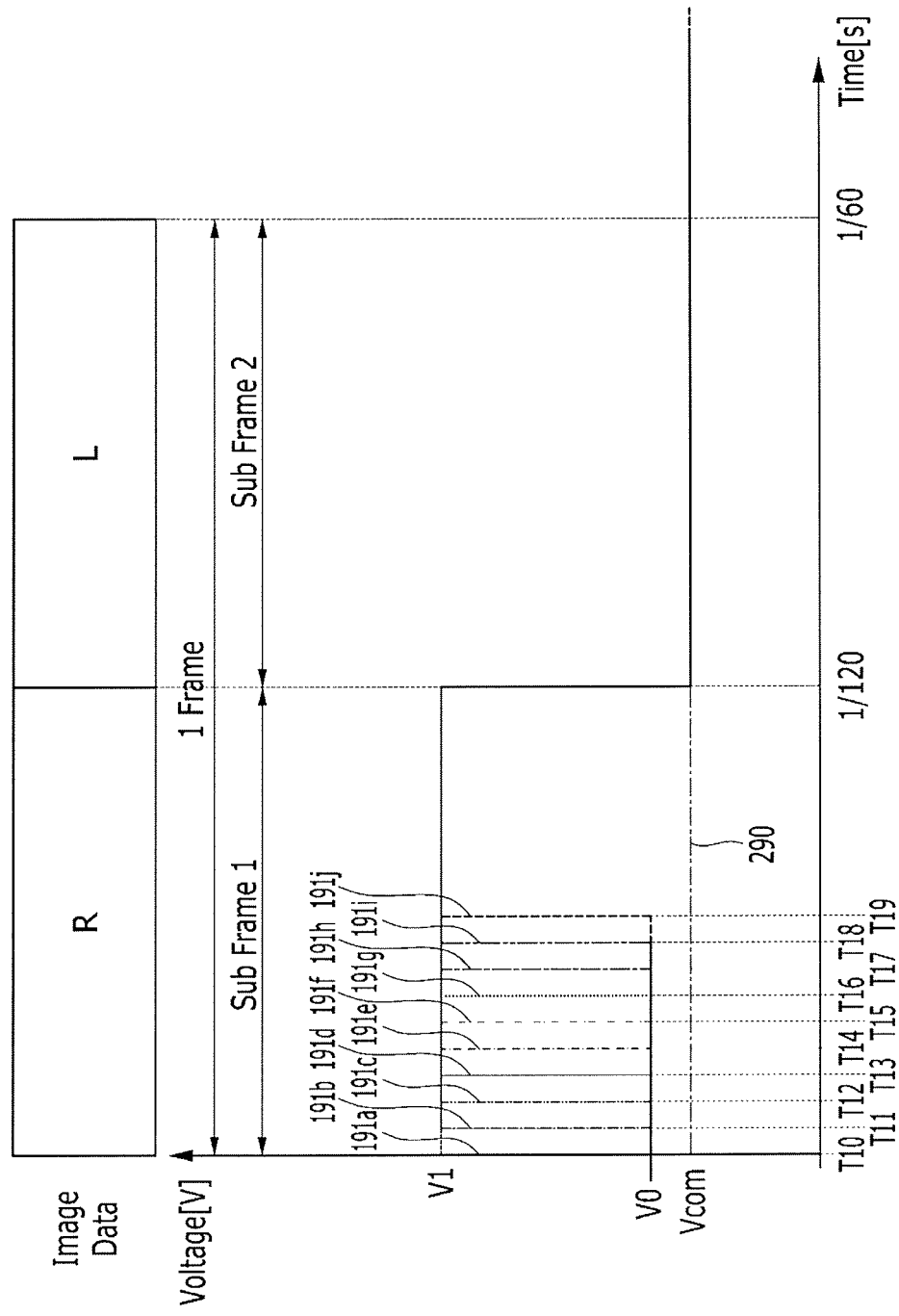
FIG. 21 is a timing diagram of a driving signal of an optical modulation device according to another exemplary embodiment of the present disclosure.
Figure 22:
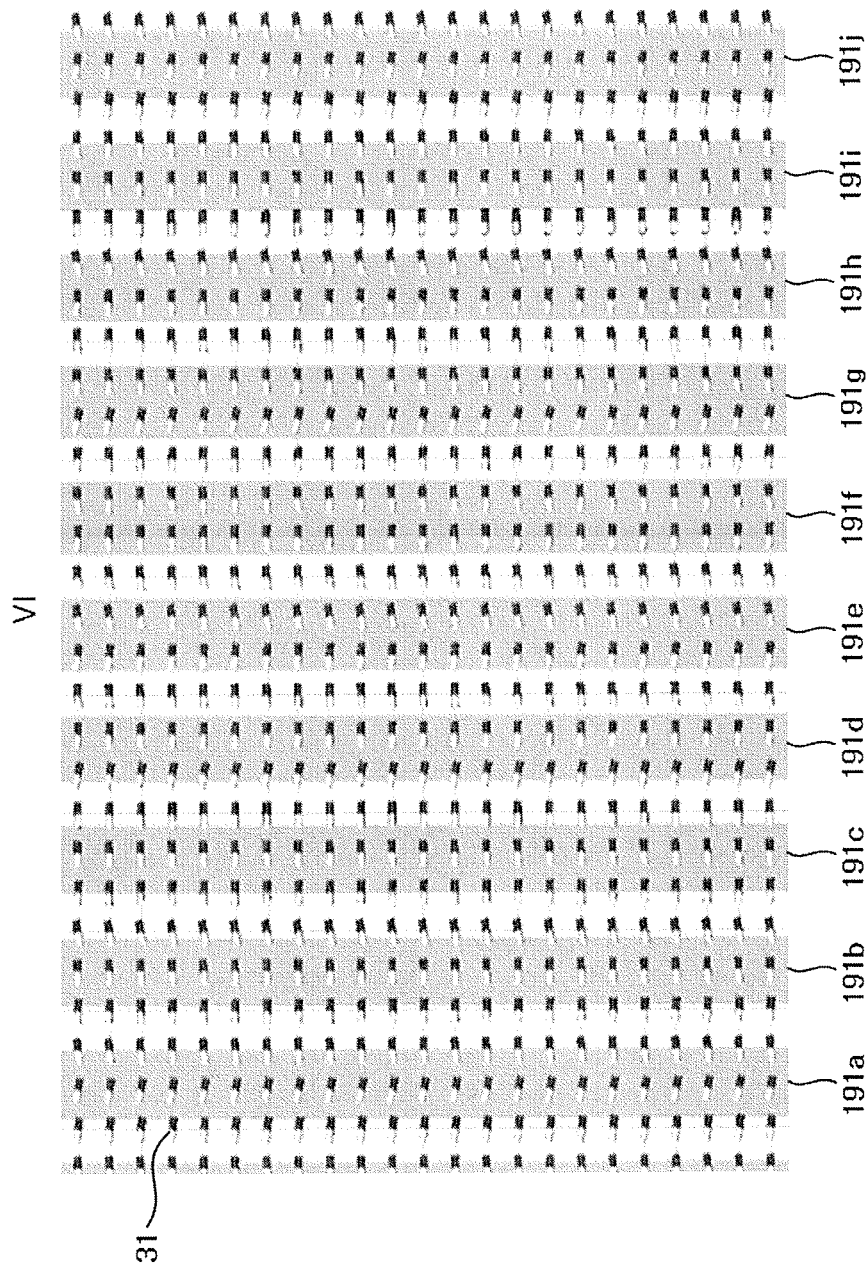
FIGS. 22 and 23 are cross-sectional views taken along plane VI of FIG. 10, which illustrate alignment of liquid crystal molecules when liquid crystal molecules have stabilized after the sequentially application of driving signals within one frame to an optical modulation device according to another exemplary embodiment of the present disclosure.
Figure 23:
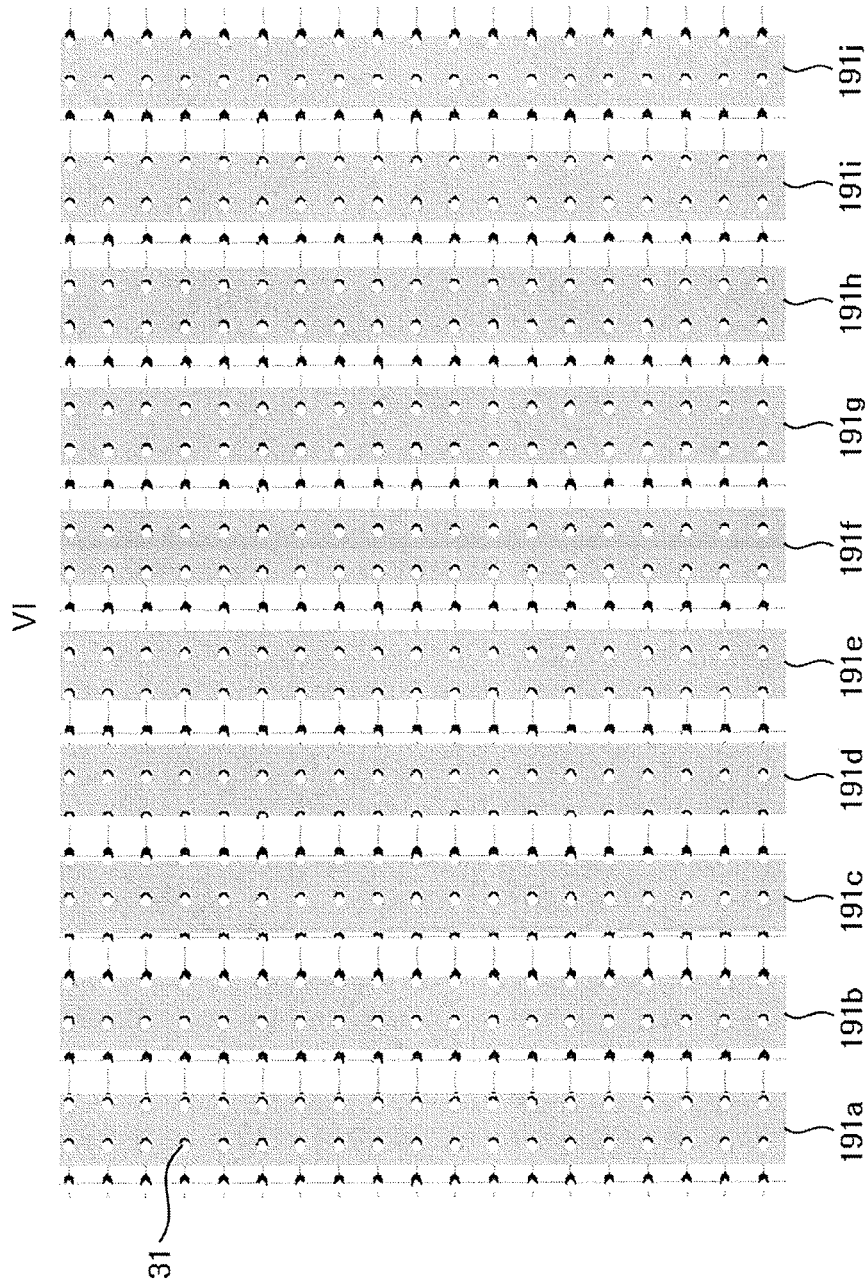
Figure 24:
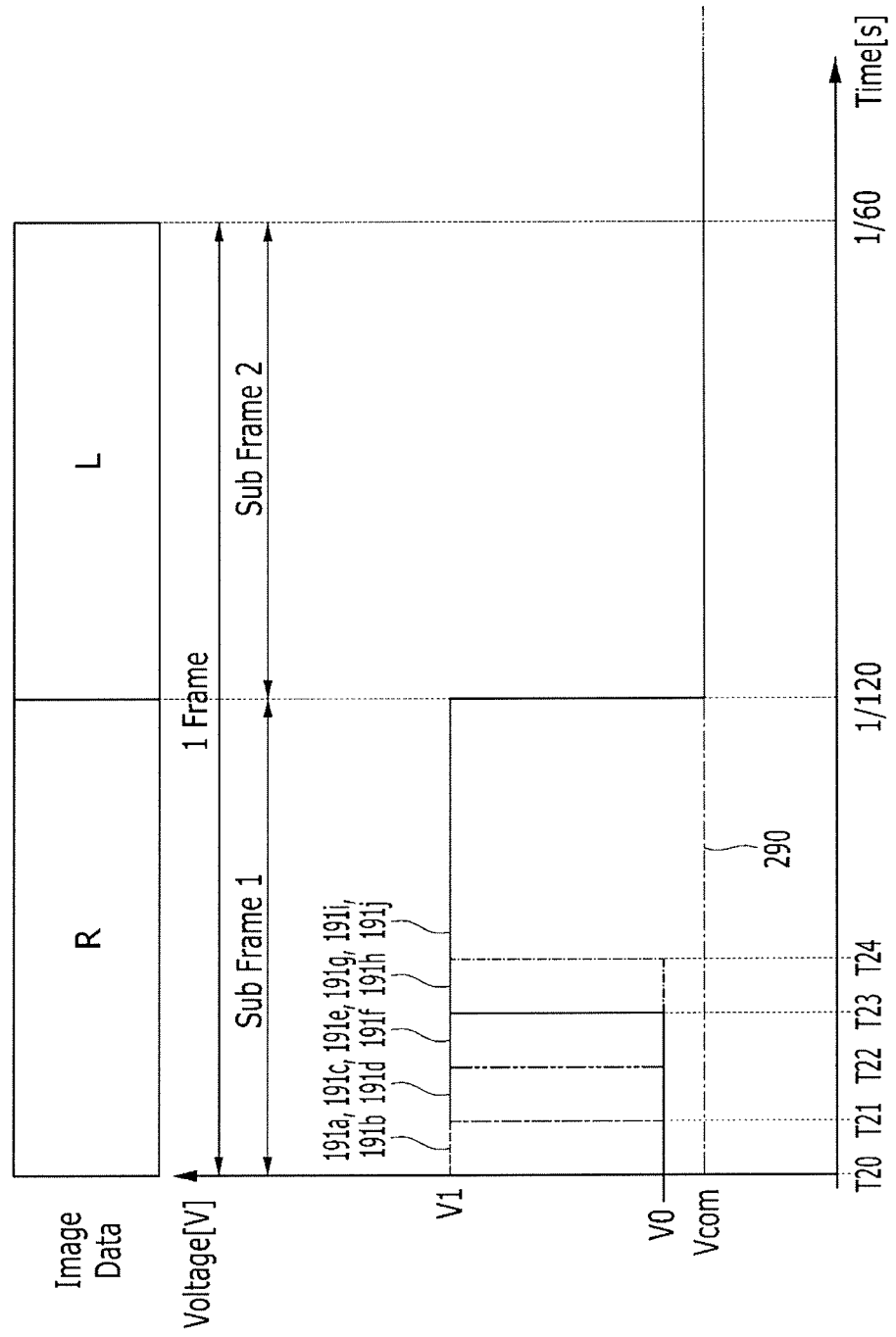
FIGS. 24 and 25 are timing diagrams of a driving signal of an optical modulation device according to another exemplary embodiment of the present disclosure.
Figure 25:
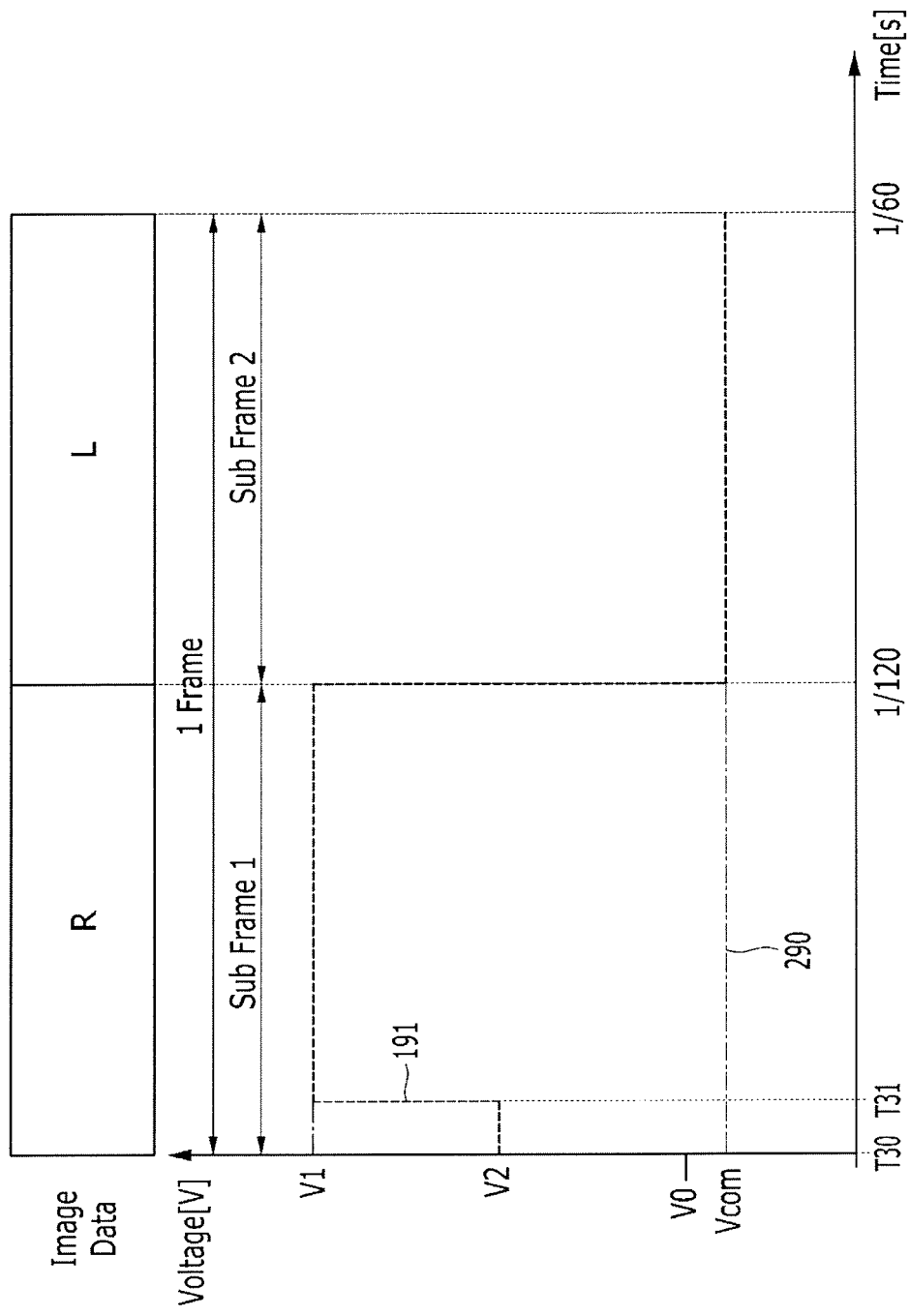

FIG. 21 is a timing diagram of driving signals of an optical modulation device 5 according to another exemplary embodiment of the present disclosure, and FIGS. 22 and 23 are cross-sectional views taken along plane VI of FIG. 10, which illustrate alignment of liquid crystal molecules when the liquid crystal molecules have stabilized after the sequential application of driving signals within one frame to an optical modulation device according to another exemplary embodiment of the present disclosure. The one frame includes consecutive first and second subframes, and a frame rate of the one frame may be assumed to be 60 Hz. In FIGS. 21 and 24-25, V0 is the initial voltage when the display does not drive as a glass 3D display.

As shown in FIG. 21, the first subframe driving signals are applied to the first to tenth electrodes 191a-191j during the first subframe. The driving signals applied to the first to tenth electrodes 191a-191j are maintained during the first subframe.

More specifically, when the optical modulation device 5 is driven in 3D mode, a fourth voltage V1 is sequentially applied to the first to tenth electrodes 191a-191j during the first subframe. For example, after the fourth voltage V1 is applied to the first electrode 191a at a first viewpoint T10, the fourth voltage V1 is applied to the second electrode 191b at a second viewpoint T11. In this case, a common voltage Vcom is applied to the upper electrode 290.

According to embodiments, time intervals during which the fourth voltage V1 is applied to the lower electrodes 191a-191j are constant. For example, a period from when the fourth voltage V1 is applied to the first electrode 191a (T10) to when the fourth voltage V1 is applied to the second electrode 191b (T11) is equal to a period from when the fourth voltage V1 is applied to the second electrode 191b (T11) to when the fourth voltage V1 is applied to the third electrode 191c (T12).

After the fourth voltage V1 is applied to the tenth electrode 191j, it may take a certain amount of time until the alignment of the liquid crystal molecules 31 stabilizes.

Since an electric field is generated by the voltage applied to the upper electrode 290 and the lower electrodes 191a-191j, most of the liquid crystal molecules 31 tilt substantially parallel to the surface of the first or second plates 100 and 200 to form in-plane alignment, as shown in FIG. 22, and long axes thereof are parallel to the x-axis. All of the liquid crystal molecules 31 are arranged in the same direction.

In this case, the display panel 300 displays the first image during the first subframe. For example, the display panel 300 may display the right eye image (R).

Light of the right eye image (R) displayed on the display panel 300 passes through the polarizer 302 to be linearly polarized in the y-axis direction. Then, the right eye image (R) light that is linearly polarized in the y-axis direction passes through the phase retardation plate 50 to become right-circularly polarized.

The optical modulation device 5 in which most of the long axes of the liquid crystal molecules 31 are parallel to the x-axis changes left circularly polarized light of the right eye image (R) to right circularly polarized light.

Next, when the first subframe process finishes, a second subframe process starts, and second subframe driving signals are applied to the first to tenth electrodes 191a-191j. The driving signals applied to the first to tenth electrodes 191a-191j are maintained during the second subframe.

More specifically, when the optical modulation device 5 is driven in 3D mode, the common voltage Vcom is simultaneously applied to the first to tenth electrodes 191a-191j for the second subframe. After the voltages are applied to the first to tenth electrodes 191a-191j, it may take a certain amount of time until the alignment of the liquid crystal molecules 31 stabilizes.

Then, as shown in FIG. 23, the liquid crystal molecules 31 tilt in a direction perpendicular to the surface of the first or second plates 100 and 200, and most of long axes of the liquid crystal molecules 31 are arranged in the same direction. All of the liquid crystal molecules 31 are arranged in the same direction.

In this case, the display panel 300 displays the second image during the second subframe. For example, the display panel 300 may display the left eye image (L).

Light of the left eye image (L) displayed on the display panel 300 passes through the polarizer 302 to be linearly polarized in the y-axis direction. Then, the left eye image (L) light that is linearly polarized in the y-axis direction passes through the phase retardation plate 50 to become left-circularly polarized.

The optical modulation device 5 in which most of the liquid crystal molecules 31 tilted in a direction perpendicular to the surface of the first and second plates 100 and 200 emits left circularly polarized light of the left image (L) as is, without changing the polarization characteristics of light received from the display panel 300.

One image frame includes the first subframe in which the display panel 300 displays the right eye image (R) and the second subframe in which the display panel 300 displays the left eye image (L).

The fourth voltage V1 is sequentially applied to the lower electrodes 191 during the first subframe, and accordingly, since the liquid crystal molecules 31 form an in-plane alignment, the optical modulation device 5 may change a circular polarization direction. Then, since left circularly polarized light of the right eye image (R) passes through the optical modulation device 5 to become right-circularly polarized, and right circularly polarized light of the right eye image (R) passes through the right eye filter 800R of the polarized glasses 800, the user's right eye may perceive the right eye image (R).

The common voltage Vcom is simultaneously applied to the lower electrodes 191 during the second subframe, and accordingly, since the liquid crystal molecules 31 are perpendicular to the surfaces of the first and second plates 100 and 200, the optical modulation device 5 does not change the circular polarization direction. Then, since right circularly polarized light of the left eye image (L) passes through the optical modulation device 5 as is and left circularly polarized light of the left eye image (L) passes through the left eye filter 800L of the polarized glasses 800, the user's left eye may perceive the left eye image (L).

Next, a driving method of an optical modulation device 5 according to another exemplary embodiment will be described with reference to FIGS. 24 and 25.

FIGS. 24 and 25 are timing diagrams of driving signals of an optical modulation device 5 according to another exemplary embodiment of the present disclosure.

When a driving method of an optical modulation device 5 according to another exemplary embodiment is described, as shown in FIG. 24, the first subframe driving signals are applied to the first to tenth electrodes 191a-191j during the first subframe. The driving signals applied to the first to tenth electrodes 191a-191j are maintained during the first subframe. In this case, the driving signals are applied to the first to tenth electrodes 191a-191j by a unit of a plurality of electrodes.

According to another exemplary embodiment of the present disclosure, the first to tenth electrodes 191a-191j are divided into five groups by combining adjacent electrodes. For example, along the x-axis direction, the first and second electrodes 191a and 191b, the third and fourth electrodes 191c and 191d, the fifth and sixth electrodes 191e and 191f, the seventh and eighth electrodes 191g and 191h, and the ninth and tenth electrodes 191i and 191j are respectively divided into a first group, a second group, a third group, a fourth group, and a fifth group.

Then, when the optical modulation device 5 is driven in 3D mode, the fourth voltage V1 is sequentially applied during the first subframe to the first to tenth electrodes 191a-191j that are divided into a plurality of groups based on positions of the electrodes. In other words, the fourth voltage is sequentially applied to the first to fifth groups. For example, after the fourth voltage V1 is applied to the first group at a first viewpoint T20, the fourth voltage V1 is applied to the second group at a second viewpoint T21. In this case, the common voltage Vcom is applied to the upper electrode 290.

According to an embodiment, time intervals during which the fourth voltage V1 is applied to the first to fifth groups are constant. For example, a period from when the fourth voltage V1 is applied to the first and second electrodes 191a and 191b (T20) to when the fourth voltage V1 is applied to the third and fourth electrodes 191c and 191d (T21) is equal to a period from when the fourth voltage V1 is applied to the third and fourth electrodes 191c and 191d (T21) to when the fourth voltage V1 is applied to the fifth and sixth electrodes 191e and 191f (T22).

After the fourth voltage V1 is applied to the fifth group, it may take a certain amount of time until the alignment of the liquid crystal molecules 31 stabilizes.

Since an electric field is generated by the voltages applied to the upper electrode 290 and the lower electrodes 191a-191j, as shown in FIG. 22, most of the liquid crystal molecules 31 tilt substantially parallel to the surfaces of the first or second plates 100 and 200 to form an in-plane alignment, and long axes thereof are parallel to the x-axis. All of the liquid crystal molecules 31 are arranged in the same direction.

In this case, the display panel 300 displays the first image during the first subframe. For example, the display panel 300 may display the right eye image (R).

Right eye image (R) light emitted by the display panel 300 passes through the polarizer 302 to become linearly polarized in the y-axis direction. Then, the right eye image (R) light that is linearly polarized in the y-axis direction passes through the phase retardation plate 50 to become right-circularly polarized.

The optical modulation device 5 in which most of the long axes of the liquid crystal molecules 31 are parallel to the x-axis changes left circularly polarized light of the right eye image (R) into right circularly polarized light.

Next, when the first subframe process finishes, a second subframe process starts, and thus second subframe driving signals are applied to the first to tenth electrodes 191a-191j. The driving signals applied to the first to tenth electrodes 191a-191j are maintained during the second subframe.

More specifically, when the optical modulation device 5 is driven in 3D mode, the common voltage Vcom is simultaneously applied to the first to tenth electrodes 191a-191j for the second subframe. After the voltage is applied to the first to tenth electrodes 191a-191j, it may take a certain amount of time until the alignment of the liquid crystal molecules 31 stabilizes.

Then, as shown in FIG. 23, the liquid crystal molecules 31 are tilted in a direction perpendicular to the surface of the first or second plates 100 and 200, and most of long axes of the liquid crystal molecules 31 are arranged in the same direction. All of the liquid crystal molecules 31 are arranged in the same direction.

In this case, the display panel 300 displays the second image during the second subframe. For example, the display panel 300 may display the left eye image (L).

Light of the left eye image (L) displayed on the display panel 300 passes through the polarizer 302 to become linearly polarized in the y-axis direction. Then, left eye image (L) light that is linearly polarized in the y-axis direction passes through the phase retardation plate 50 to become left-circularly polarized.

The optical modulation device 5 in which most of the liquid crystal molecules 31 are tilted in a direction perpendicular to the surface of the first or second plates 100 and 200 emit left circularly polarized left image (L) as is, without changing the polarization characteristics of light received from the display panel 300.

One image frame includes the first subframe in which the display panel 300 displays the right eye image (R) and the second subframe in which the display panel 300 displays the left eye image (L).

The lower electrodes 191 are divided into a plurality of groups, and the fourth voltage V1 is applied sequentially to the plurality of groups during the first subframe, and accordingly, since the liquid crystal molecules 31 form an in-plane alignment, the optical modulation device 5 may change a circular polarization direction. Then, since left circularly polarized light of the right eye image (R) passes through the optical modulation device 5 to become right-circularly polarized and right circularly polarized light of the right eye image(R) passes through the right eye filter 800R of the polarized glasses 800, the user's right eye may perceive the right eye image (R).

The common voltage Vcom is simultaneously applied to the lower electrodes 191 during the second subframe, and accordingly, since the liquid crystal molecules 31 are perpendicular to the surfaces of the first and second plates 100 and 200, the optical modulation device 5 does not change the circular polarization direction. Then, since right circularly polarized light of the left eye image (L) passes through the optical modulation device 5 as is and left circularly polarized light of the left eye image (L) passes through the left eye filter 800L of the polarized glasses 800, the user's left eye may perceive the left eye image (L).

When a driving method of an optical modulation device 5 according to a another exemplary embodiment of the present disclosure is described, as shown in FIG. 25, the first subframe driving signals are applied to the first to tenth electrodes 191a-191j during the first subframe.

The driving signals applied to the first to tenth electrodes 191a-191j are maintained during the first subframe. In this case, driving signals whose values changed at least once are applied to all of the first to tenth electrodes 191a-191j.

More specifically, when the optical modulation device 5 is driven in 3D mode, a fifth voltage V2 is applied to all of the first to tenth electrodes 191a-191j during the first subframe. After a certain amount of time elapses after application of the fifth voltage V2 to all of the first to tenth electrodes 191a-191j, the fourth voltage V1 is applied to all of the first to tenth electrodes 191a-191j.

For example, the fifth voltage V2 is simultaneously applied to all of the first to tenth electrodes 191a-191j at a first viewpoint T30. Then, the fourth voltage V1 is simultaneously applied to all of the first to tenth electrodes 191a-191j at a second viewpoint T31. In this case, the common voltage Vcom is applied to the upper electrode 290. The fourth voltage V1 is greater than the fifth voltage V2.

After the fourth voltage V1 is applied, it may take a certain amount of time until the alignment of the liquid crystal molecules 31 stabilizes.

Since an electric field is generated by the voltages applied to the upper electrode 290 and the lower electrodes 191a-191j, as shown in FIG. 22, most of the liquid crystal molecules 31 are tilted substantially parallel to the surfaces of the first or second plates 100 and 200 to form an in-plane alignment, and long axes thereof are parallel to the x-axis. All of the liquid crystal molecules 31 are arranged in the same direction.

In this case, the display panel 300 displays the first image during the first subframe. For example, the display panel 300 may display the right eye image (R).

Right eye image (R) light emitted by the display panel 300 passes through the polarizer 302 to become linearly polarized in the y-axis direction. Then, the right eye image (R) light that is linearly polarized in the y-axis direction passes through the phase retardation plate 50 to become right-circularly polarized.

The optical modulation device 5 in which most of the long axes of the liquid crystal molecules 31 are parallel to the x-axis changes left circularly polarized light of the right eye image (R) to right circularly polarized light.

Next, when the first subframe process finishes, a second subframe process starts, and thus driving signals of the second subframe are applied to the first to tenth electrodes 191a-191j. The driving signals applied to the first to tenth electrodes 191a-191j are maintained during the second subframe.

More specifically, when the optical modulation device 5 is driven in 3D mode, the common voltage Vcom is simultaneously applied to the first to tenth electrodes 191a-191j for the second subframe. After the voltages are applied to the first to tenth electrodes 191a-191j, it may take a certain amount of time until the alignment of the liquid crystal molecules 31 stabilizes.

Then, as shown in FIG. 23, the liquid crystal molecules 31 are tilted in a direction perpendicular to the surfaces of the first or second plates 100 and 200, and most of long axes of the liquid crystal molecules 31 are arranged in the same direction. All of the liquid crystal molecules 31 are arranged in the same direction.

In this case, the display panel 300 displays the second image during the second subframe. For example, the display panel 300 may display the left eye image (L).

Left eye image (L) light emitted by the display panel 300 passes through the polarizer 302 to become linearly polarized in the y-axis direction. Then, left eye image (L) light that is linearly polarized in the y-axis direction passes through the phase retardation plate 50 to become left-circularly polarized.

The optical modulation device 5 in which most of the liquid crystal molecules 31 are tilted in a direction perpendicular to the surfaces of the first and second plates 100 and 200 emits left circularly polarized light of the left image (L) as is, without changing the polarization characteristics of light received from the display panel 300.

One image frame includes the first subframe in which the display panel 300 displays the right eye image (R) and the second subframe in which the display panel 300 displays the left eye image (L).

Driving signals whose values changed at least once are applied to the lower electrodes 191 during the first subframe, and accordingly, since the liquid crystal molecules 31 form an in-plane alignment, the optical modulation device 5 may change a circular polarization direction. Then, since left circularly polarized light of the right eye image (R) passes through the optical modulation device 5 to become right-circularly polarized, and right circularly polarized light of the right eye image (R) passes through the right eye filter 800R of the polarized glasses 800, the user's right eye may perceive the right eye image (R).

The common voltage Vcom is simultaneously applied to the lower electrodes 191 during the second subframe, and accordingly, since the liquid crystal molecules 31 are perpendicular to the surfaces of the first and second plates 100 and 200, the optical modulation device 5 does not change the circular polarization direction. Then, since right circularly polarized light of the left eye image (L) passes through the optical modulation device 5 as is and left circularly polarized light of the left eye image (L) passes through the left eye filter 800L of the polarized glasses 800, the user's left eye may perceive the left eye image (L).

According to driving methods described with reference to FIGS. 21, 24, and 25, when the display panel 300 displays images of different viewpoints in each of a plurality of subframes included in one frame, the optical modulation device 5 may change a circular polarization direction of received light to correspond to the subframe.

For a single user to view stereoscopic images without using polarized glasses 800, the optical modulation device 5 operates as a Fresnel lens in which a forward phase slope and a backward phase slope are repeatedly implemented.

In addition, for a single user to view stereoscopic images wearing the polarized glasses 800, the optical device 1 displays a stereoscopic image by a temporal division method. In this case, the optical modulation device 5 changes the circular polarization direction to correspond to the subframe. A single user can perceive the left circularly polarized left eye image with the left eye and the right circularly polarized right eye image with the right eye through the polarized glasses 800. Accordingly, binocular disparity is generated, and as a result, a single user may perceive stereoscopic images.

In addition, for a plurality of users to view stereoscopic images, the optical modulation device 5 can change the circular polarization direction to correspond to the subframe. Each of the plurality of users can perceive the left circularly polarized left eye image with the left eye and the right circularly polarized right eye image with the right eye through the polarized glasses 800. Accordingly, binocular disparity is generated, and as a result, the plurality of users may perceive stereoscopic images.

While this disclosure has been described in connection with what is presently considered to be practical exemplary embodiments, it is to be understood that embodiments of the disclosure are not limited to the disclosed embodiments, but, on the contrary, are intended to cover various modifications and equivalent arrangements included within the spirit and scope of the appended claims.

What is claimed is:

1. An optical device, comprising:
a display panel that displays an image;
a phase retardation plate disposed on the display panel that includes a quarter-wave plate; and
an optical modulation device that includes a first plate and second plate disposed to face each other, a liquid crystal layer disposed between the first plate and the second plate and that includes a plurality of liquid crystal molecules, and a plurality of unit areas,
wherein the first plate includes a plurality of lower electrodes that extend in a first direction and are arranged in a second direction that crosses the first direction, the second plate includes an upper electrode,
wherein light emitted from the display panel is received by the optical modulation device, and
when the display panel displays a first image during a first subframe, the optical modulation device applies a first driving signal to the plurality of lower electrodes and changes a circular polarization direction of light received from the phase retardation plate, and
when the display panel displays a second image during a second subframe following the first subframe, the optical modulation device applies a second driving signal different from the first driving signal to the plurality of lower electrodes and maintains the circular polarization direction of light received from the phase retardation plate.

2. The optical device of claim 1, wherein
the display panel includes a polarizer that linearly polarizes light of an image.

3. The optical device of claim 1, wherein the first plate includes a first aligner, the second plate includes a second aligner, and
an alignment direction of the first aligner and an alignment direction of the second aligner are substantially parallel to each other.

4. The optical device of claim 3, wherein
the plurality of liquid crystal molecules tilt parallel to surfaces of the first plate and the second plate during the first subframe.

5. The optical device of claim 3, wherein
long axes of the plurality of liquid crystal molecules are arranged in a direction parallel to the second direction.

6. The optical device of claim 3, wherein
the plurality of liquid crystal molecules tilt perpendicular to the surfaces of the first plate and the second plate during the second subframe.

7. The optical device of claim 3, wherein
the optical modulation device sequentially applies a first voltage to the lower electrodes included in the unit area along the second direction during the first subframe.

8. The optical device of claim 7, wherein
time intervals of the first voltage respectively applied to the lower electrodes along the second direction during the first subframe are constant.

9. The optical device of claim 3, wherein
the optical modulation device sequentially applies the first voltage to each of a plurality of groups of adjacent lower electrodes included in the unit area along the second direction.

10. The optical device of claim 9, wherein
time intervals of the first voltage respectively applied to the groups along the second direction during the first subframe are constant.

11. The optical device of claim 3, wherein
the optical modulation device simultaneously applies the first voltage to the plurality of lower electrodes during a first time interval of the first subframe, and the optical modulation device simultaneously applies a second voltage greater than the first voltage to the plurality of lower electrodes during a second time interval of the first subframe that follows the first time interval.

12. A method of driving an optical device that includes a display panel that emits light to displays an image, a phase retardation plate disposed on the display panel that includes a quarter-wave plate, and an optical modulation device that includes a first plate and a second plate disposed to face each other, and a liquid crystal layer disposed between the first plate and the second plate and that includes a plurality of liquid crystal molecules and receives light emitted from the display panel, the method comprising:
displaying, by the display panel, a first image during a first subframe;
applying, by the optical modulation device, a first driving signal to a plurality of lower electrodes included in the first plate during the first subframe, wherein the optical modulation device changes a circular polarization direction of light received from the phase retardation plate, wherein the plurality of liquid crystal molecules tilt parallel to surfaces of the first and second plates and long axes of the plurality of liquid crystal molecules arrange in a direction parallel to the second direction, wherein the lower electrodes extend in a first direction and are arranged in a second direction crossing the first direction;
displaying, by the display panel, a second image during a second subframe that follows the first subframe; and
applying, by the optical modulation device, a second driving signal different from the first driving signal to the plurality of lower electrodes during the second subframe, wherein the optical modulation device maintains the circular polarization direction of light received from the phase retardation plate, and wherein the plurality of liquid crystal molecules tilt perpendicular to the surfaces of the first and second plates.

13. The method of claim 12, wherein
the first driving signal sequentially applies a first voltage to the lower electrodes included in a unit area of the optical modulation device along the second direction.

14. The method of claim 13, wherein
time intervals of the first voltage sequentially applied to the lower electrodes along the second direction are constant.

15. The method of claim 12, wherein
the first driving signal sequentially applies a first voltage to each of a plurality of groups of adjacent lower electrodes included in a unit area of the optical modulation device along the second direction.

16. The method of claim 15, wherein
time intervals of the first voltage sequentially applied to the groups along the second direction during the first subframe are constant.

17. The method of claim 12, wherein
the first driving signal simultaneously applies a first voltage to the plurality of lower electrodes during a first time interval of the first subframe, and simultaneously applies a second voltage greater than the first voltage to the plurality of lower electrodes during a second time interval of the first subframe that follows the first time interval.

18. The method of claim 12, wherein the optical modulation device changes a circular polarization direction of light received from a phase retardation plate disposed on the display panel during the first subframe, and the optical modulation device maintains the circular polarization direction of light received from the phase retardation plate during the second subframe.

* * * * *